US012754495B2

(12) United States Patent
Matsuzaki et al.

(10) Patent No.: US 12,754,495 B2
(45) Date of Patent: Oct. 6, 2026

(54) INTERMEDIATE TRANSFER UNIT AND IMAGE FORMING APPARATUS WITH REPLACEABLE CLEANING DEVICE

(71) Applicant: CANON KABUSHIKI KAISHA, Tokyo (JP)

(72) Inventors: Kenta Matsuzaki, Chiba (JP); Ryo Nameki, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/899,615

(22) Filed: Sep. 27, 2024

(65) Prior Publication Data

US 2025/0110426 A1 Apr. 3, 2025

(30) Foreign Application Priority Data

Sep. 30, 2023 (JP) ................................ 2023-171007

(51) Int. Cl.
*G03G 15/16* (2006.01)
*G03G 15/00* (2006.01)
*G03G 21/16* (2006.01)

(52) U.S. Cl.
CPC ........... *G03G 15/161* (2013.01); *G03G 15/55* (2013.01); *G03G 21/168* (2013.01); *G03G 2215/1661* (2013.01); *G03G 2221/1642* (2013.01)

(58) Field of Classification Search
CPC .. G03G 15/161; G03G 15/55; G03G 15/5054; G03G 21/168; G03G 2215/1623; G03G 2215/1661; G03G 2221/1642
(Continued)

(56) References Cited

U.S. PATENT DOCUMENTS

2004/0126149 A1* 7/2004 Saito .................... G03G 15/161 399/297
2007/0201897 A1* 8/2007 Maeda ................. G03G 15/161 399/101

(Continued)

FOREIGN PATENT DOCUMENTS

JP 2013011756 A 1/2013
JP 2015143760 A 8/2015

(Continued)

*Primary Examiner* — Robert B Beatty

(74) *Attorney, Agent, or Firm* — Canon U.S.A., Inc. IP Division

(57) ABSTRACT

An image forming apparatus includes an image bearing member and an intermediate transfer unit including an intermediate transfer member (an intermediate transfer belt) and a cleaning device, the intermediate transfer unit is attachable to and detachable from an apparatus main body of the image forming apparatus, the cleaning device is attachable to and detachable from a unit main body of the intermediate transfer unit, a storage section is disposed in the cleaning device, a control section is disposed in the apparatus main body, and the control section is configured to read first information regarding whether the cleaning device is new, and second information regarding whether the intermediate transfer member attached to the intermediate transfer unit is new, when the intermediate transfer unit, to which the cleaning device that is new is attached, is attached to the image forming apparatus main body.

2 Claims, 14 Drawing Sheets

(58) Field of Classification Search
USPC .............. 399/12, 31, 34, 101, 121, 302, 308
See application file for complete search history.

(56) References Cited

U.S. PATENT DOCUMENTS

| | | | | |
|---|---|---|---|---|
| 2008/0175619 | A1* | 7/2008 | Katoh | G03G 21/168 399/121 |
| 2009/0279905 | A1* | 11/2009 | Zensai | G03G 15/55 399/12 |
| 2014/0064769 | A1* | 3/2014 | Sugiura | G03G 15/168 399/101 |
| 2017/0336738 | A1* | 11/2017 | Ohta | G03G 15/1665 |
| 2020/0103819 | A1* | 4/2020 | Hatano | G03G 21/168 |
| 2020/0387106 | A1* | 12/2020 | Hatano | G03G 15/1615 |
| 2022/0082962 | A1* | 3/2022 | Kubota | G03G 15/161 |
| 2022/0163907 | A1* | 5/2022 | Ikegami | G03G 15/161 |

FOREIGN PATENT DOCUMENTS

| | | | |
|---|---|---|---|
| JP | 2020042142 | A | 3/2020 |
| JP | 2022048958 | A | 3/2022 |

* cited by examiner

PRINTING STANDBY STATE

COLOR IMAGE PRINTING STATE

MONOCHROME IMAGE PRINTING STATE

INTERMEDIATE TRANSFER UNIT AND IMAGE FORMING APPARATUS WITH REPLACEABLE CLEANING DEVICE

BACKGROUND

Field

The present disclosure relates to an image forming apparatus using an electrophotographic method or an electrostatic recording method, such as a copying machine, a printer, a facsimile apparatus, a multifunction peripheral, or other device, having a plurality of functions of these apparatuses.

Description of the Related Art

Conventionally, for example, as an image forming apparatus such as a copying machine using an electrophotographic method, there is an image forming apparatus employing an intermediate transfer method for secondarily transferring a toner image primarily transferred from a photosensitive member as an image bearing member to an intermediate transfer member to a recording material. As the intermediate transfer member, an intermediate transfer belt composed of an endless belt is often used. In the image forming apparatus using the intermediate transfer method, a cleaning device including a cleaning member removes attached substances such as toner remaining on the intermediate transfer belt (transfer residual toner) after a toner image is secondarily transferred from the intermediate transfer belt to the recording material.

In the image forming apparatus using the intermediate transfer method, the life of the intermediate transfer belt or the cleaning device is shorter than the life of an apparatus main body of the image forming apparatus (hereinafter also referred to simply as the "apparatus main body"), and therefore, the intermediate transfer belt or the cleaning device often should be replaced as a consumable product. There is a case where an intermediate transfer unit including the intermediate transfer belt and the cleaning device is made attachable to and detachable from the apparatus main body in an integrated manner.

Conventionally, in a case where an operator such as a user or a service person replaces the intermediate transfer unit including the intermediate transfer belt and the cleaning device, the operator inputs information indicating the replacement to a control section of the image forming apparatus through an operation section disposed in the apparatus main body.

Based on the information, for example, the accumulated value of an index value regarding the usage from the start of the use of the intermediate transfer unit (when the intermediate transfer unit is new) that is accumulated to be displayed as an estimate of the time to replace the intermediate transfer unit on the operation section of the apparatus main body is reset.

For example, there is a case where predetermined control (also referred to as "initial control") in a case where a new intermediate transfer unit becomes attached to the apparatus main body is executed based on the information. For example, as the cleaning device, a cleaning device that includes a cleaning blade as a cleaning member that abuts a cleaning target member such as the intermediate transfer belt, and scrapes and removes attached substances such as transfer residual toner from the surface of the moving cleaning target member is widely used. The cleaning blade is formed of an elastic body such as rubber, and a frictional force acts on an abutment portion between the cleaning blade and the cleaning target member. If the frictional force is too great, there is a possibility that a failure such as the turning up of the cleaning blade occurs. Accordingly, a method for supplying toner to the abutment portion between the cleaning blade and the cleaning target member and reducing the frictional force of the abutment portion between the cleaning blade and the cleaning target member using the toner (or an external additive of the toner) as a lubricant is known. If the cleaning blade is new, there is a case where the frictional force acting on the abutment portion between the cleaning blade and the cleaning target member is likely to be great. Thus, there is a case where, as the initial control, an operation for supplying the toner (or an external additive of the toner) as a lubricant to the abutment portion between the cleaning blade and the cleaning target member is executed.

Japanese Patent Application Laid-Open No. 2013-11756 discusses a configuration in which in a case where a cartridge including an image bearing member and a cleaning blade is new, the amount of supply of toner by an operation for supplying toner to an abutment portion between the cleaning blade and the image bearing member is made greater than in a case where the cartridge is not new.

Incidentally, generally, an intermediate transfer unit is configured so that an intermediate transfer belt and a cleaning device (particularly, a cleaning member) reach the ends of their lives almost at the same time. However, for example, there is a case where the difference between the life of the intermediate transfer belt and the life of the cleaning device is great depending on the recording materials to be used. In such a case, the cleaning device is often more likely to be influenced by the recording materials, and the life of the cleaning device is often shorter. In such a case, if only the cleaning device is replaced with a new cleaning device, an image defect does not occur. If, however, the intermediate transfer belt and the cleaning device are replaced in an integrated manner as the intermediate transfer unit, there is no choice but to replace also the intermediate transfer belt in an integrated manner, and this leads to an increase in the running cost of this image forming apparatus.

Accordingly, it is possible that in an intermediate transfer unit including an intermediate transfer belt and a cleaning device, the cleaning device is made further attachable to and detachable from a belt conveyance section that is another component including the intermediate transfer belt. Consequently, it is possible to enable only a minimum desired component to be replaced, thereby preventing an increase in the running cost of the image forming apparatus. However, it has been found that in this case, for example, there is the following issue.

That is, in this case, if a configuration is employed in which an operator inputs information indicating that a unit to be replaced is replaced as described above, and for example, in a case where only the cleaning device is replaced, the operator can erroneously input information indicating that the intermediate transfer belt is replaced. In this case, for example, there is a possibility that a failure occurs where information regarding the usage of the intermediate transfer unit according to the usage of intermediate transfer belt cannot be appropriately displayed. For example, in a case where only the cleaning device is replaced, the operator can forget to input information indicating the replacement. In this case, for example, initial control that should be performed in a case where the cleaning device is replaced with a new cleaning device is not correctly performed, and this can cause a failure such as the turning up of a cleaning blade.

SUMMARY

The present disclosure is directed to enabling only a cleaning device to be replaced in an intermediate transfer unit and also enabling processing according to the replacement of only the cleaning device or the replacement of the entirety of the intermediate transfer unit to be appropriately performed with a simple configuration.

According to some embodiments, an intermediate transfer unit includes an intermediate transfer member configured to be rotated and to bear a toner image, a unit main body disposed to be attachable to and detachable from an image forming apparatus main body and configured to rotatably support the intermediate transfer member, a cleaning device disposed to be attachable to and detachable from the unit main body and including a cleaning member configured to clean the intermediate transfer member, and a storage section disposed in the cleaning device and configured to store first information regarding whether the cleaning device is new, and second information regarding whether; the intermediate transfer member attached to the intermediate transfer unit is new, when the intermediate transfer unit, to which the cleaning device that is new is attached, is attached to the image forming apparatus main body.

According to some other embodiments, an image forming apparatus includes an image forming section configured to form a toner image, an intermediate transfer member configured to be rotated and to bear the toner image, a unit main body disposed to be attachable to and detachable from an image forming apparatus main body and configured to rotatably support the intermediate transfer member, a cleaning device disposed to be attachable to and detachable from the unit main body and including a cleaning member configured to clean the intermediate transfer member, a storage section disposed in the cleaning device and configured to store first information regarding whether the cleaning device is new, and second information regarding whether the intermediate transfer member attached to the intermediate transfer unit is new, when the intermediate transfer unit to which the cleaning device that is new is attached, is attached to the image forming apparatus main body, and a control section configured to perform, in a case where the cleaning device is new, control so that the image forming section executes an operation for supplying toner to an abutment portion between the cleaning member and a surface of the intermediate transfer member based on the first information stored in the storage section.

Further features of the present disclosure will become apparent from the following description of exemplary embodiments with reference to the attached drawings.

DESCRIPTION OF THE EMBODIMENTS

Various exemplary embodiments, features, and aspects of an image forming apparatus according to the present disclosure will be described in more detail below with reference to the drawings.

1. Overall Configuration and Operation of Image Forming Apparatus

Figure 1:
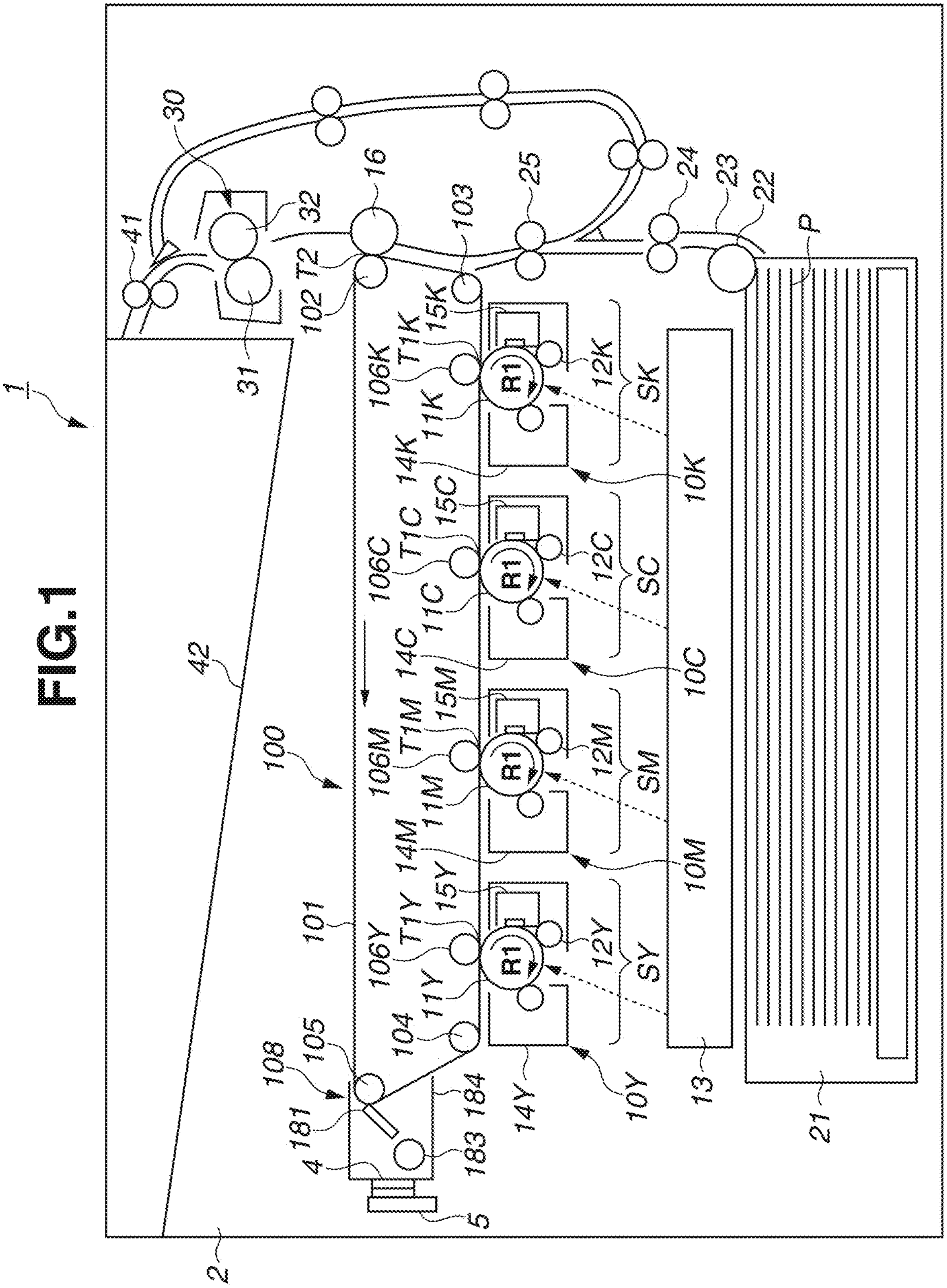
FIG. 1 is a schematic cross-sectional view of an image forming apparatus.

FIG. 1 is a schematic cross-sectional view of an image forming apparatus 1 according to a first exemplary embodiment. The image forming apparatus 1 according to the present exemplary embodiment is a tandem multifunction peripheral employing an intermediate transfer method and capable of forming a full-color image using an electrophotographic method and has the functions of a copying machine, a printer, and a facsimile apparatus. For example, the image forming apparatus 1 can form an image on a sheet-like recording material P according to an image signal sent from an external apparatus such as a personal computer.

The image forming apparatus 1 includes a first image forming section SY, a second image forming section SM, a third image forming section SC, and a fourth image forming section SK that form yellow (Y), magenta (M), cyan (C), and black (K) toner images, respectively, as a plurality of image forming sections. Components provided for yellow, magenta, cyan, and black colors and having the same or corresponding functions or configurations are occasionally collectively described by omitting "Y", "M", "C", and "K" at the ends of signs indicating components corresponding to the respective colors. In the present exemplary embodiment, the image forming section S includes a photosensitive drum 11, a charging roller 12, an exposure device 13, a development device 14, and a drum cleaning device 15.

The photosensitive drum 11 that is a drum-type (cylindrical) photosensitive member (electrophotographic photosensitive member) as an image bearing member is rotationally driven in the direction of an arrow R1 (clockwise) in FIG. 1 at a predetermined peripheral speed (process speed). The surface (the outer peripheral surface) of the rotating photosensitive drum 11 is uniformly subjected to a charging process to a predetermined potential having a predetermined polarity (a negative polarity in the present exemplary embodiment) by the charging roller 12 as charging means. The surface of the photosensitive drum 11 subjected to the charging process is scanned and exposed by the exposure device (laser scanner) 13 as exposure means according to image information, thereby forming an electrostatic latent image (an electrostatic image) on the photosensitive drum 11. In the present exemplary embodiment, the exposure device 13 is configured as a single unit capable of exposing each of the photosensitive drums 11Y, 11M, 11C, and 11K. The exposure device 13 may be independently provided for each of the image forming sections SY, SM, SC, and SK. That is, image signals corresponding to yellow, magenta, cyan, and black colors are input to the exposure device 13, and the exposure device 13 emits laser light to the surfaces of the photosensitive drums 11Y, 11M, 11C, and 11K according to the image signals, thereby neutralizing charges and forming electrostatic latent images. Toner as a developer is supplied from the development device 14 as development means to the electrostatic latent image formed on the photosensitive drum 11, thereby developing (visualizing) the electrostatic latent image and forming a toner image on the photosensitive drum 11. In the present exemplary embodiment, toner charged to the same polarity (a negative polarity in the present exemplary embodiment) as the charge polarity of the photosensitive drum 11 becomes attached to the exposed portion (the image portion) on the photosensitive drum 11 in which the absolute value of the potential is decreased by uniformly performing the charging process on the photosensitive drum 11 and then exposing the photosensitive drum 11 (reversal development). In the present exemplary embodiment, the normal charge polarity of the toner that is the charge polarity of the toner when the electrostatic latent image is developed is a negative polarity.

An intermediate transfer belt 101 composed of an endless belt as an intermediate transfer member is disposed opposed to the photosensitive drums 11Y, 11M, 11C, and 11K of the image forming sections SY, SM, SC, and SK, respectively. The intermediate transfer belt 101 is stretched by a plurality of stretching rollers. In the present exemplary embodiment, the plurality of stretching rollers includes a secondary transfer inner roller 102, a first assistance roller 103, a second assistance roller 104, and a tension roller 105. The intermediate transfer belt 101 is driven by inputting a driving force to the secondary transfer inner roller 102 having the function of a driving roller and rotates (makes a circling movement) in the direction of an arrow R2 (counterclockwise) in FIG. 1 at a peripheral speed (a process speed) set to be almost the same as the peripheral speed of the photosensitive drum 11. The first assistance roller 103 and the second assistance roller 104 form an approximately flat image transfer surface of the intermediate transfer belt 101. The tension roller 105 is biased by a tension spring 204 (FIGS. 4A, 4B, and 4C) that is a biasing member as biasing means, thereby applying a predetermined tension to the intermediate transfer belt 101. The number of rollers that stretch the intermediate transfer belt 101 is not limited to four. On the inner peripheral surface side of the intermediate transfer belt 101, a primary transfer roller 106 as a primary transfer member forming primary transfer means is placed corresponding to each of the photosensitive drums 11Y, 11M, 11C, and 11K between the first assistance roller 103 and the second assistance roller 104. The primary transfer roller 106 presses the inner peripheral surface of the intermediate transfer belt 101 toward the photosensitive drum 11. This forms a primary transfer portion (primary transfer nip portion) T1 where the photosensitive drum 11 and the intermediate transfer belt 101 are in contact with each other. Among the plurality of stretching rollers, the stretching rollers other than the secondary transfer inner roller 102 and the primary transfer rollers 106Y, 106M, 106C, and 106K are driven to rotate according to the rotation of the intermediate transfer belt 101.

A predetermined pressure force and an electrostatic load bias are applied in the primary transfer portion T1, whereby the toner image formed on the photosensitive drum 11 is transferred (primarily transferred) onto the rotating intermediate transfer belt 101. In the primary transfer step, a primary transfer power supply (not illustrated) applies a primary transfer voltage that is a direct-current voltage having a polarity (a positive polarity in the present exemplary embodiment) opposite to the normal charge polarity of the toner to the primary transfer roller 106. For example, when a full-color image is formed, toner images of yellow, magenta, cyan, and black colors formed on the photosensitive drums 11Y, 11M, 11C, and 11K are sequentially transferred so that the toner images are superimposed on the intermediate transfer belt 101. Image forming processes for the respective colors subjected to parallel processing by the image forming sections SY, SM, SC, and SK are performed at the timing when a toner image to be primarily transferred on the downstream side is superimposed on a toner image primarily transferred on the upstream side on the intermediate transfer belt 101. The number of image forming sections S is not limited to four, and the arrangement order of the image forming sections S for the respective colors is not limited to the arrangement order in the present exemplary embodiment, either.

The intermediate transfer belt 101 includes a base layer and a surface layer disposed on the outer peripheral surface of the base layer. The surface layer is a coating layer formed directly on the base layer to secure the release properties of toner. That is, the intermediate transfer belt 101 has a two-layer configuration. The surface layer, however, may include a coating layer and an adhesive layer that bonds the coating layer and the base layer. That is, the intermediate transfer belt 101 may have a three-layer configuration.

The base layer of the intermediate transfer belt 101 is further described. The base layer contains any of resins including polyimide (PI), polyamide (PA), polyphenylene sulfide (PPS), polyetherimide (PEI), and polyether ether ketone (PEEK). As the base layer, a product obtained by dispersing any of these resins containing an appropriate amount of a conductive filler such as carbon or an ionic conductive material is used. A surface resistivity α of the base layer alone is $1.0\times10^{9}\ \Omega/\square \leq \alpha \leq 1.0\times10^{13}\Omega/\square$. It is desirable that the surface resistivity α of the base layer alone be $6.3\times10^{9}\ \Omega/\square \leq \alpha \leq 3.2\times10^{10}\Omega/\square$. A thickness D of the base layer satisfies $30\ \mu m \leq D \leq 100\ \mu m$.

The surface layer of the intermediate transfer belt 101 is further described. The surface layer contains at least a binding resin and a perfluoropolyether (PFPE). That is, the surface layer is mainly composed of a binding resin, a perfluoropolyether (PFPE), a dispersant, and an additive.

The binding resin included in the surface layer is used to disperse the PFPE, secure the adhesiveness with the base layer, or secure the characteristics of the mechanical strength. Examples of the binding resin according to the present exemplary embodiment include a styrene resin, an acrylic resin, a methacrylic resin, an epoxy resin, a polyester resin, a polyether resin, a silicone resin, and a polyvinyl butyral resin. The mixture of these binding resins can also be used. Among the above binding resins, particularly, it is desirable to use the methacrylic resin or the acrylic resin (hereinafter, the methacrylic resin and the acrylic resin will be collectively referred to as an "acrylic resin").

The "perfluoropolyether" refers to an oligomer or a polymer having a perfluoroalkylene ether as a repeat unit. Examples of the repeat unit of the perfluoroalkylene ether include the repeat units of a perfluoro methylene ether, a perfluoroethylene ether, and a perfluoropropylene ether. It is desirable that the surface layer contain a dispersant for dispersing the perfluoropolyether. The surface layer contains such a dispersant and thereby can further stabilize the dispersion state of the PFPE in the surface layer.

As the dispersant, it is desirable to use a compound having a portion with an affinity for a perfluoroalkyl chain and hydrocarbon (a compound having a portion with a great affinity for fluorine and a portion with a small affinity for fluorine), such as a surfactant, an amphipathic block copolymer, or an amphipathic graft copolymer. Although in the present exemplary embodiment, the intermediate transfer belt 101 including two or more layers is used, the intermediate transfer belt 101 including a single layer may be used.

On the outer peripheral surface side of the intermediate transfer belt 101, the secondary transfer outer roller 16 as a secondary transfer member forming secondary transfer means is disposed at a position opposed to the secondary transfer inner roller 102 as an opposing member. The secondary transfer outer roller 16 is pressed toward the secondary transfer inner roller 102 and applies an external force to the secondary transfer inner roller 102 via the intermediate transfer belt 101. This forms a secondary transfer portion (secondary transfer nip portion) T2 where the intermediate transfer belt 101 and the secondary transfer outer roller 16 are in contact with each other. The secondary transfer outer roller 16 is driven to rotate according to the rotation of the intermediate transfer belt 101. A predetermined pressure force and an electrostatic load bias are applied in the secondary transfer portion T2, whereby the toner image formed on the intermediate transfer belt 101 is transferred (secondarily transferred) onto a recording material P conveyed while being nipped between the intermediate transfer belt 101 and the secondary transfer outer roller 16. In the secondary transfer step, a secondary transfer power supply (not illustrated) applies a secondary transfer voltage (a secondary transfer bias) that is a direct-current voltage having a polarity (a positive polarity in the present exemplary embodiment) opposite to the normal charge polarity of the toner to the secondary transfer outer roller 16. The secondary transfer inner roller 102 is connected to a ground potential (electrically grounded). A configuration may be employed in which a secondary transfer voltage having the same polarity as the normal charge polarity of the toner is applied to the secondary transfer inner roller 102 as the secondary transfer member, and the secondary transfer outer roller 16 as an opposing member is electrically grounded.

Recording materials (sheets, transfer materials, recording media, media) P are stored in a stacked manner in a recording material cassette 21 as a recording material storage portion. The recording materials P stored in the recording material cassette 21 are sent out one by one from the recording material cassette 21 by a feeding roller 22 as feeding means. Each recording material P sent out from the recording material cassette 21 is conveyed through a conveyance path 23 to a registration roller pair 25 as conveyance means by a conveyance roller pair 24 as conveyance means. After the skew of the recording material S is corrected, the recording material P is conveyed to the secondary transfer portion T2 by the registration roller pair 25 by matching the timings of the recording material P and the toner image on the intermediate transfer belt 101.

The recording material P to which the toner image is transferred is conveyed to a fixing device 30 as fixing means. Using a fixing roller 31 including a heat source and a pressure roller 32 that is in pressure contact with the fixing roller 31, the fixing device 30 heats and pressurizes the recording material P bearing the unfixed toner image, thereby fixing (melting or firmly fixing) the toner image to the recording material P. The fixing device 30 applies a predetermined pressure force and a predetermined amount of heat to the recording material P between the fixing roller 31 and the pressure roller 32. The recording material P to which the toner image is fixed is discharged (output) onto a discharge tray 42 disposed outside an apparatus main body 2 of the image forming apparatus 1 by a discharge roller pair 41.

On the other hand, toner remaining on the photosensitive drum 11 after the primary transfer step (primary transfer residual toner) is removed from the photosensitive drum 11 and collected by the drum cleaning device 15 that is a cleaning device as photosensitive member cleaning means. The drum cleaning device 15 scrapes and collects the primary transfer residual toner from the surface of the rotating photosensitive drum 11 using a cleaning blade as a cleaning member that abuts the surface of the photosensitive drum 11. Attached substances such as toner remaining on the intermediate transfer belt 101 after the secondary transfer step (secondary transfer residual toner) and paper dust are removed from the intermediate transfer belt 101 and collected by a belt cleaning device 108 that is a cleaning device as intermediate transfer member cleaning means. The collected substances such as toner and paper dust collected by the drum cleaning device 15 and the belt cleaning device 108 are conveyed to a waste toner container (not illustrated) through a waste toner conveyance path (not illustrated).

In the present exemplary embodiment, in the image forming section S, the photosensitive drum 11, the charging roller 12, the development device 14, and the drum cleaning device 15 form a process cartridge 10 attachable to and detachable from the apparatus main body 2 in an integrated manner.

In the present exemplary embodiment, the intermediate transfer belt 101, the plurality of stretching rollers 102 to 105, the primary transfer rollers 106Y, 106M, 106C, and 106K, and the belt cleaning device 108 form an intermediate transfer unit 100 attachable to and detachable from the apparatus main body 2 in an integrated manner. In the intermediate transfer unit 100, the belt cleaning device 108 is further attachable to and detachable from another component including the intermediate transfer belt 101. The intermediate transfer unit 100 will be further described below.

In the present exemplary embodiment, the apparatus main body 2 corresponds to a portion other than the process cartridge 10 and the intermediate transfer unit 100 in the image forming apparatus 1.

In the present exemplary embodiment, the intermediate transfer unit 100 is placed at a middle position in the up-down direction in the apparatus main body 2 so that the intermediate transfer unit 100 is attachable to and detachable from the apparatus main body 2. The intermediate transfer unit 100 is supported on a supporting frame 2*f* (rail-like attachment portion 2*f*) (FIG. 5) disposed in the apparatus main body 2 when the intermediate transfer unit 100 becomes attached to the apparatus main body 2. If the intermediate transfer unit 100 becomes attached to the apparatus main body 2, the belt cleaning device 108 disposed in the intermediate transfer unit 100 becomes connected to the waste toner conveyance path (not illustrated) disposed in the apparatus main body 2. In the present exemplary embodiment, the four process cartridges 10Y, 10M, 10C, and 10K are disposed below the intermediate transfer unit 100 from upstream to downstream along the moving direction of the image transfer surface of the intermediate transfer belt 101.

2. Intermediate Transfer Unit

Next, the configuration of the intermediate transfer unit 100 and the periphery of the intermediate transfer unit 100 according to the present exemplary embodiment is further described. Regarding the image forming apparatus 1 and the components of the image forming apparatus 1, the near side of the plane of the paper in FIG. 1 when the image forming apparatus 1 operates is a "near side", and the far side of the plane of the paper is a "far side". The front-back direction connecting the "near side" and the "far side" is approximately parallel to the rotational axis direction of each of the photosensitive drum 11 and the stretching rollers 102 to 105 of the intermediate transfer belt 101 when the image forming apparatus 1 operates. Regarding the image forming apparatus 1 and the components of the image forming apparatus 1, the "up-down direction" refers to the up-down direction in the direction of gravity (the vertical direction), but does not mean only immediately above and immediately below, and includes the upper side and the lower side of a horizontal plane passing through a component or a position to which attention is paid.

Figure 2:
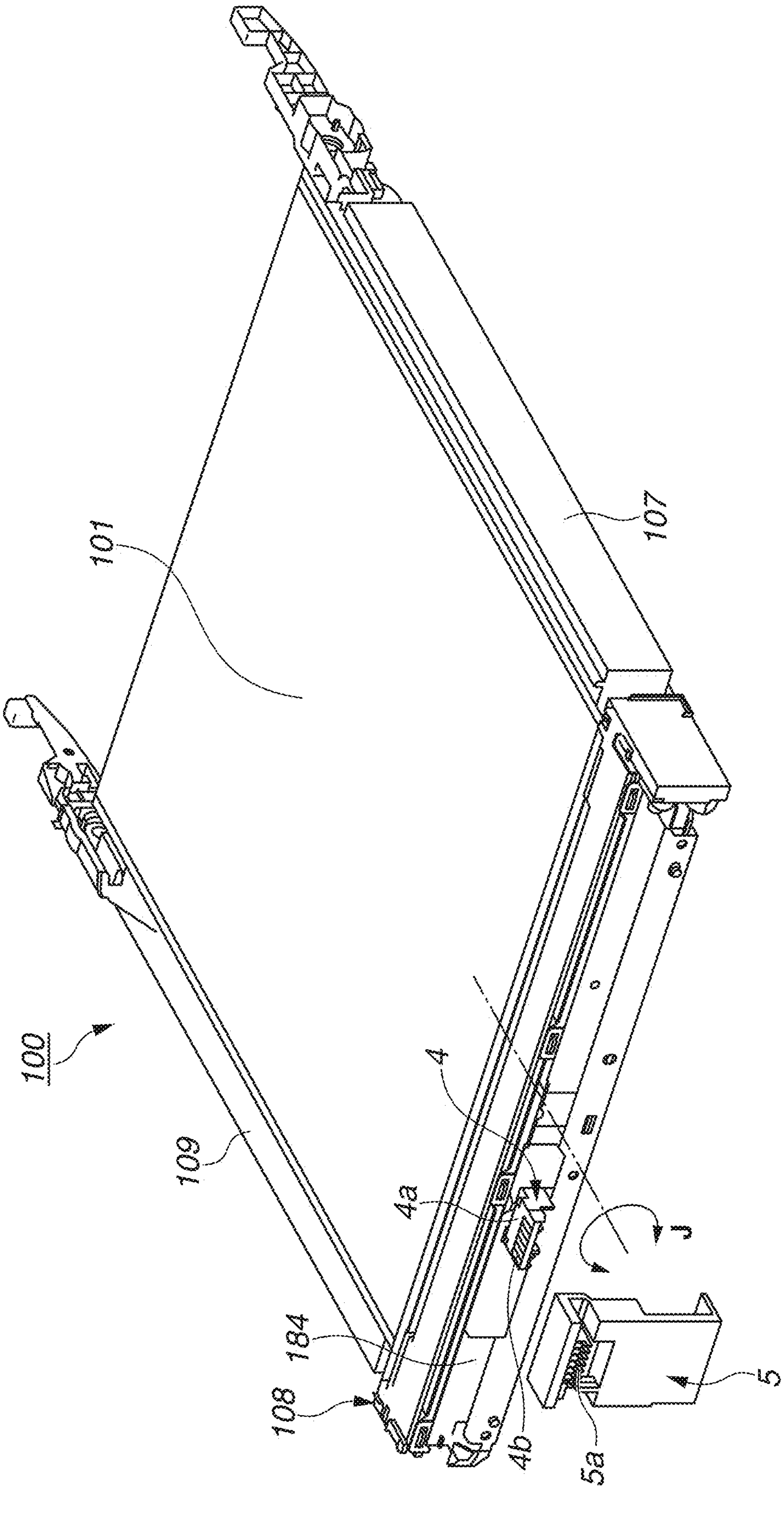
FIG. 2 is a schematic perspective view illustrating an intermediate transfer unit.
Figure 3:
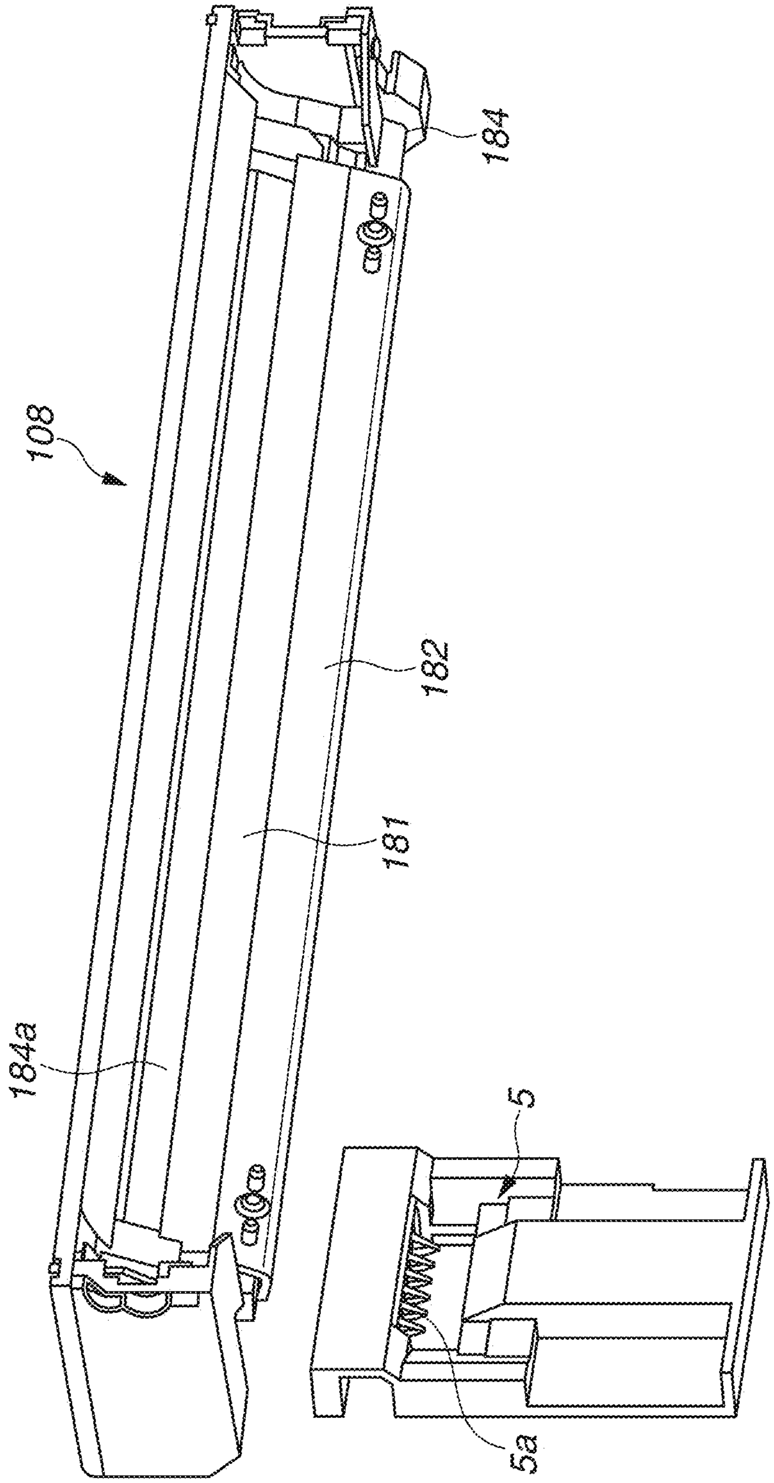
FIG. 3 is a schematic perspective view illustrating a belt cleaning device.
Figure 4A:
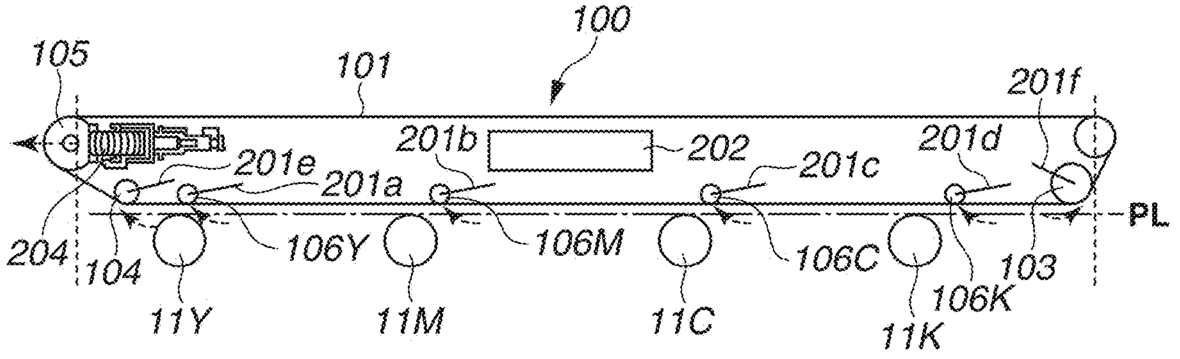
FIGS. 4A, 4B, and 4C are schematic cross-sectional views for describing changes in a stretched form of an intermediate transfer belt.
Figure 4B:
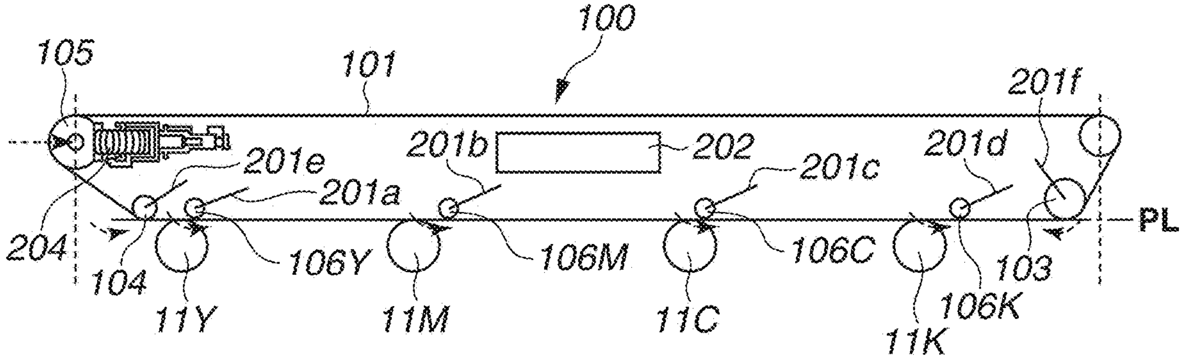
Figure 4C:
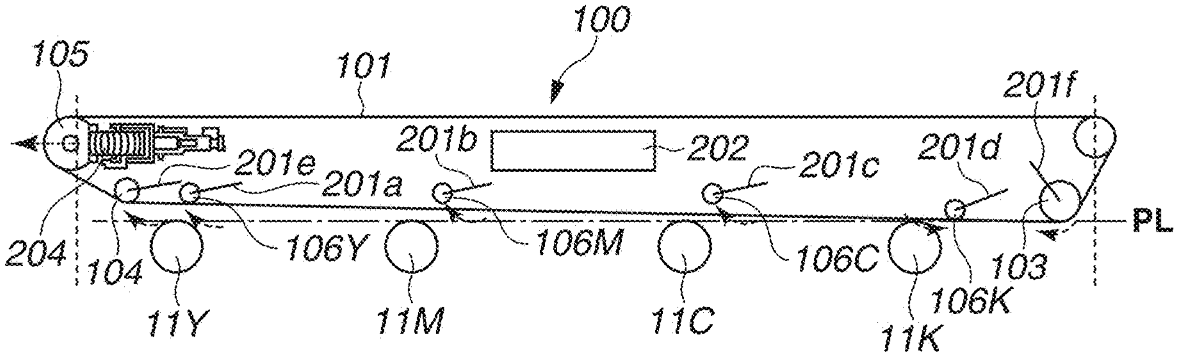
Figure 5:
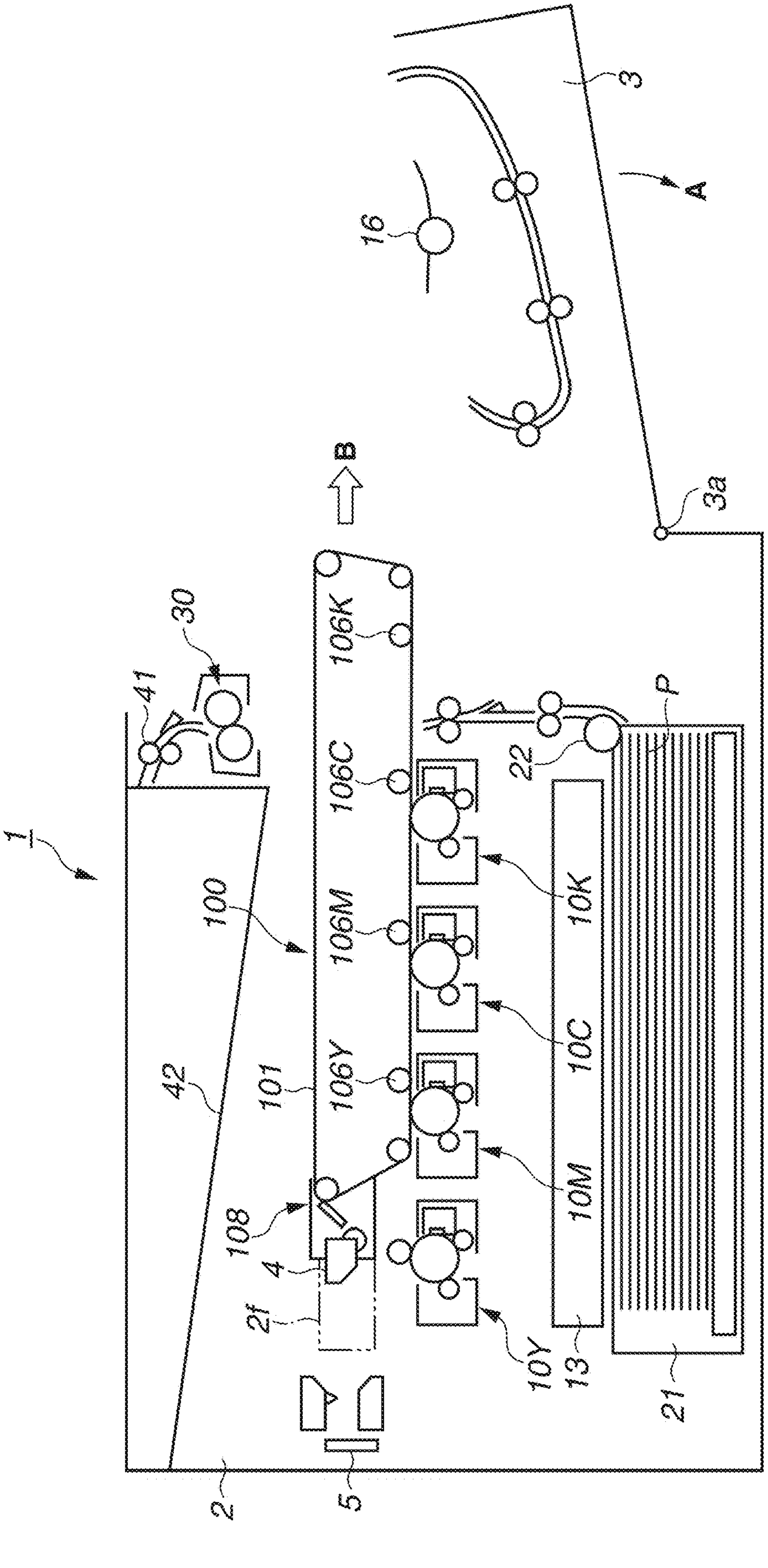
FIG. 5 is a schematic cross-sectional view of the image forming apparatus when the intermediate transfer unit becomes attached to or detached from the image forming apparatus.

FIG. 2 is a schematic perspective view illustrating the intermediate transfer unit 100 in the state immediately before the intermediate transfer unit 100 becomes attached to a predetermined position in the apparatus main body 2 and a connection section 5 disposed in the apparatus main body 2. FIG. 3 is a schematic perspective view illustrating the belt cleaning device 108 in the state where the belt cleaning device 108 is detached from the intermediate transfer unit 100 and the connection section 5 disposed in the apparatus main body 2. FIGS. 4A, 4B, and 4C are schematic cross-sectional views of the intermediate transfer unit 100 for describing the stretched form of the intermediate transfer belt 101 according to the present exemplary embodiment. FIG. 5 is a schematic cross-sectional view of the image forming apparatus 1 illustrating the state where the intermediate transfer unit 100 becomes attached to or detached from the apparatus main body 2.

The intermediate transfer unit 100 includes a unit frame 107 and the plurality of stretching rollers 102 to 105 (FIG. 1) rotatably held by the unit frame 107. The intermediate transfer unit 100 includes the intermediate transfer belt 101 stretched by the plurality of stretching rollers 102 to 105, the primary transfer rollers 106Y, 106M, 106C, and 106K (FIG. 1), and the belt cleaning device 108.

As illustrated in FIGS. 1 and 3, the belt cleaning device 108 includes a cleaning blade 181 as a cleaning member and a fixed metal plate 182 as a blade supporting member. The belt cleaning device 108 includes a conveyance screw 183 as a conveyance member and a cleaning container 184 as a housing. The cleaning blade 181 is a plate-like member formed of an elastic body having a predetermined length in each of a longitudinal direction approximately parallel to a direction approximately orthogonal to the moving direction of the surface of the intermediate transfer belt 101 and a short direction approximately orthogonal to the longitudinal direction, and having a predetermined thickness. In the present exemplary embodiment, the cleaning blade 181 is formed of urethane rubber as an elastic body. The cleaning blade 181 is disposed opposed to the tension roller 105 via the intermediate transfer belt 101 at an angle in a direction counter to the moving direction of the surface of the intermediate transfer belt 101. That is, the cleaning blade 181 is disposed so that a free end portion in the short direction of the cleaning blade 181 is directed upstream with respect to the moving direction of the surface of the intermediate transfer belt 101. Then, with an edge portion of the free end portion in the short direction abutting the surface of the intermediate transfer belt 101, the cleaning blade 181 applies an external force to the tension roller 105 via the intermediate transfer belt 101. A fixed end portion in the short direction of the cleaning blade 181 is bonded and fixed to the fixed metal plate 182. The fixed metal plate 182 to which the cleaning blade 181 is fixed is held by being fixed with screws to the cleaning container 184. Regarding the belt cleaning device 108 and the components of the belt cleaning device 108, a direction approximately parallel to the longitudinal direction of the cleaning blade 181 (the direction (the width direction) approximately orthogonal to the moving direction of the surface of the intermediate transfer belt 101) is a longitudinal direction.

Collected substances such as toner collected from the intermediate transfer belt 101 by the cleaning blade 181 are stored in a collected toner storage portion 184*a* formed in the cleaning container 184. In the collected toner storage portion 184*a*, the conveyance screw 183 (FIG. 1) is disposed. The conveyance screw 183 conveys the collected substances such as toner in the collected toner storage portion 184*a* to one end portion (e.g., an end portion on the near side) of the cleaning container 184 along the longitudinal direction of the belt cleaning device 108. Then, the collected substances such as toner conveyed by the conveyance screw 183 are discharged through a discharge opening (not illustrated) disposed in the one end portion of the cleaning container 184 and are sent to the waste toner conveyance path (not illustrated) disposed in the apparatus main body 2. The collected substances sent to the waste toner conveyance path are conveyed to the waste toner container (not illustrated) detachably attached to the apparatus main body 2. The waste toner container is replaced when the waste toner container is full.

The intermediate transfer unit 100 is attachable to and detachable from the apparatus main body 2. In the intermediate transfer unit 100, the belt cleaning device (cleaning unit) 108 is further attachable to and detachable from a belt conveyance section (belt unit) 109 that is another component including the intermediate transfer belt 101. In the present exemplary embodiment, the belt conveyance section 109 includes the unit frame 107, the plurality of stretching rollers 102 to 105 (FIG. 1), the intermediate transfer belt 101, and the primary transfer rollers 106Y, 106M, 106C, and 106K (FIG. 1).

As illustrated in FIG. 5, the image forming apparatus 1 includes a right door unit 3 as an opening/closing member that opens the inside of the apparatus main body 2 in a side portion on the right side of the apparatus main body 2 when the apparatus main body 2 is viewed from the near side. The right door unit 3 is configured to open by pivoting its upper portion downward (in the direction of an arrow A in FIG. 5) about a pivotal shaft 3*a* disposed below the right door unit 3 and extending in the front-back direction and close by pivoting its upper portion upward (in a direction opposite to the direction of the arrow A in FIG. 5). The right door unit 3 is opened and closed by an operator such as a user or a service person operating a handle portion disposed in the right door unit 3. The right door unit 3 is opened by dividing at least a part of the conveyance path of the recording material P from the recording material cassette 21 through the secondary transfer portion T2 to the fixing device 30 into a front surface (a surface to which the toner image is transferred) side and a back surface side of the recording material P. The secondary transfer outer roller 16 is attached on the right door unit 3 side. If the right door unit 3 is opened, the right door unit 3 is opened such that the secondary transfer outer roller 16 is separated from the intermediate transfer belt 101. If the operator opens the right door unit 3, the operator can access the intermediate transfer unit 100 attached to the inside of the apparatus main body 2.

The operator operates a handle portion disposed in the unit frame 107 and thereby can pull out the intermediate transfer unit 100 to the right side (in the direction of an arrow B in FIG. 5) when the apparatus main body 2 is viewed from the near side and detach the intermediate transfer unit 100 from the apparatus main body 2. Conversely, the operator can insert the intermediate transfer unit 100 to the left side (in a direction opposite to the direction of the arrow B in FIG. 5) when the apparatus main body 2 is viewed from the near side and attach the intermediate transfer unit 100 to the apparatus main body 2. The operator can attach and detach the belt cleaning device 108 to and from the belt conveyance section 109 of the intermediate transfer unit 100 detached from the apparatus main body 2. The intermediate transfer unit 100 becomes attached to or detached from the apparatus main body 2 in the state where the belt cleaning device 108 is attached to the belt conveyance section 109. As described above, the intermediate transfer unit 100 is moved by being supported by the rail-like attachment portion 2*f* disposed in a frame body in the apparatus main body 2 and also becomes attached by being positioned at a predetermined attachment position (FIG. 1) in the attachment portion 2*f*. In the present exemplary embodiment, the intermediate transfer unit 100 is moved in an approximately horizontal direction and becomes attached to or detached from (inserted into or removed from) the apparatus main body 2.

Regarding the intermediate transfer belt 101, only the intermediate transfer belt 101 may be able to be replaced in the belt conveyance section 109, or the entirety of the belt conveyance section 109 may be able to be replaced. In the present exemplary embodiment, however, in a case where the belt cleaning device 108 and the intermediate transfer belt 101 are simultaneously replaced, the entirety of the intermediate transfer unit 100 is replaced.

With reference to FIGS. 4A, 4B, and 4C, the stretched form of the intermediate transfer belt 101 according to the present exemplary embodiment is described. FIGS. 4A, 4B, and 4C illustrate the stretched form of the intermediate transfer belt 101 (the positions of the stretching rollers 102 to 105 and the orientation of the belt cleaning device 108) in a printing standby state, a color image printing state, and a monochrome image printing state, respectively. In the present exemplary embodiment, as illustrated in FIGS. 4A, 4B, and 4C, the stretched form of the intermediate transfer belt 101 is changed between a printing standby state (when the intermediate transfer unit 100 becomes attached to or detached from the apparatus main body 2), a color image printing state, and a monochrome image (black monochromatic image) printing state. The intermediate transfer unit 100 includes bearing members 201*a* to 201*f* that rotatably support the primary transfer rollers 106Y, 106M, 106C, and 106K, the first assistance roller 103, and the second assistance roller 104, respectively. The bearing members 201*a* to 201*f* are supported by the unit frame 107 so that the bearing members 201*a* to 201*f* can move the respective rollers in a direction toward and a direction away from a photosensitive member tangent plane PL. The photosensitive member tangent plane PL is a common tangent plane of the plurality of photosensitive drums 11Y, 11M, 11C, and 11K on the side where the plurality of photosensitive drums 11Y, 11M, 11C, and 11K comes into contact with the intermediate transfer belt 101. The intermediate transfer unit 100 includes a movement mechanism (abutment/separation mechanism) 202 that moves the bearing members 201*a* to 201*f*.

As illustrated in FIG. 4A, in the printing standby state (when the intermediate transfer unit 100 becomes attached to or detached from the apparatus main body 2), the movement mechanism 202 arranges the bearing members 201*a* to 201*f* so that all the primary transfer rollers 106Y, 106M, 106C, and 106K, the first assistance roller 103, and the second assistance roller 104 are disposed at a second position (a separate position) further away from the photosensitive member tangent plane PL than from a first position. Consequently, the intermediate transfer belt 101 separates from all the photosensitive drums 11Y, 11M, 11C, and 11K. That is, when the intermediate transfer unit 100 becomes attached to or detached from the apparatus main body 2, a space that makes the intermediate transfer unit 100 attachable to and detachable from the apparatus main body 2 without rubbing the photosensitive drums 11Y, 11M, 11C, and 11K and the intermediate transfer belt 101 against each other is disposed between the photosensitive drums 11Y, 11M, 11C, and 11K and the intermediate transfer belt 101. The intermediate transfer unit 100 becomes attached to or detached from the apparatus main body 2 by being moved in a direction along (approximately parallel to, in the present exemplary embodiment) the photosensitive member tangent plane PL. As illustrated in FIG. 4B, in the color image printing state, the movement mechanism 202 arranges the bearing members 201*a* to 201*f* so that all the primary transfer rollers 106Y, 106M, 106C, and 106K, the first assistance roller 103, and the second assistance roller 104 are disposed at the first position (an abutment position) closer to the photosensitive member tangent plane PL than to the second position.

Consequently, the intermediate transfer belt 101 comes into contact with all the photosensitive drums 11Y, 11M, 11C, and 11K. As illustrated in FIG. 4C, in the monochrome image printing state, the movement mechanism 202 arranges the bearing members 201*a* to 201*f* so that the primary transfer rollers 106Y, 106M, and 106C for yellow, magenta, and cyan, respectively, and the second assistance roller 104 are disposed at the second position (the separate position), and the primary transfer roller 106K for black and the first assistance roller 103 are disposed at the first position (the abutment position). Consequently, the intermediate transfer belt 101 comes into contact with only the photosensitive drum 11K for black among the four photosensitive drums 11Y, 11M, 11C, and 11K.

3. Overview of Control According to Present Exemplary Embodiment

In the present exemplary embodiment, the life of the intermediate transfer belt 101 is shorter than the life of the apparatus main body 2. Thus, the intermediate transfer belt

101 can be replaced with a new or unused, hereinafter referred to as "new" intermediate transfer belt 101 by making the intermediate transfer unit 100 attachable to and detachable from the apparatus main body 2. In the present exemplary embodiment, the life of the belt cleaning device 108, particularly the life of the cleaning blade 181 of the belt cleaning device 108, is set to be approximately the same as the life of the intermediate transfer belt 101. Thus, in the present exemplary embodiment, regarding the intermediate transfer unit 100, it is assumed that normally, the entirety of the intermediate transfer unit 100 in which the belt cleaning device 108 and the belt conveyance section 109 (including the intermediate transfer belt 101) are integrated together is replaced. As described above, however, the difference between the life of the intermediate transfer belt 101 and the life of the belt cleaning device 108 may be great depending on the recording materials P to be used. This may cause toner slipping through in which toner accidentally slips through the cleaning blade 181. Thus, in the present exemplary embodiment, the belt cleaning device 108 can be replaced with a new belt cleaning device 108 by making the belt cleaning device 108 attachable to and detachable from the belt conveyance section 109 of the intermediate transfer unit 100. As described above, in the present exemplary embodiment, the belt cleaning device 108 is further attachable to and detachable from the belt conveyance section 109 in the intermediate transfer unit 100. Consequently, also in a case where the belt cleaning device 108 breaks down in the intermediate transfer unit 100, it is possible to replace only the belt cleaning device 108 and continue to use the intermediate transfer belt 101. Thus, it is possible to enable only a minimum desired component to be replaced, thereby preventing an increase in the running cost of the image forming apparatus 1.

In view of a general operation, it is desirable that an image forming apparatus be configured to display information regarding the usage of the entirety of an intermediate transfer unit including a cleaning device and an intermediate transfer belt (a belt conveyance section) as an estimate of the time to replace the intermediate transfer unit. For example, the image forming apparatus can display information regarding the usage such as the remaining life value of the entirety of the intermediate transfer unit.

In this configuration, however, if a configuration is employed in which the operator inputs information indicating that a unit to be replaced is replaced as in conventional means, and for example, in a case where only the belt cleaning device is replaced, the operator can erroneously input information indicating that the intermediate transfer belt is replaced. In this case, for example, there is a possibility that a failure occurs where information regarding the usage of the intermediate transfer unit according to the usage of the intermediate transfer belt cannot be appropriately displayed.

Accordingly, in the present exemplary embodiment, in the belt cleaning device 108 of the intermediate transfer unit 100, a memory holder (memory holding unit) 4 as a supporting member including a memory board **4*a* as a storage section forming storage means is provided. In the memory board 4*a*, information indicating whether the belt cleaning device 108 is new (hereinafter also referred to simply as "old/new information") is recorded. In the memory board 4*a*, information indicating whether the intermediate transfer unit 100 in which the belt cleaning device 108 and the belt conveyance section 109 (including the intermediate transfer belt 101) are integrated together is shipped or the belt cleaning device 108 is shipped alone (hereinafter also referred to simply as "unit configuration information") is recorded. In the "unit configuration information", it may be indirectly determined "whether the belt cleaning device 108 is shipped alone" using both the "old/new information" and information indicating whether the intermediate transfer belt 101 attached to the intermediate transfer unit 100 is new. That is, in the memory board 4*a*, the information indicating whether the intermediate transfer belt 101 attached to the intermediate transfer unit 100** is new may be recorded as information for acquiring the unit configuration information.

In the present exemplary embodiment, in the apparatus main body 2, a connection section (contact spring holding member, contact holder) 5 including a contact spring **5*a* for obtaining electrical conduction with the memory board 4*a* is disposed to read information recorded in the memory board 4*a* disposed in the belt cleaning device 108**.

The memory holder 4 forms a supporting member that supports the memory board **4*a* including a memory contact 4*b* that is an electric connection portion. The connection section 5 forms an engagement member that holds the contact spring 5*a* that is an electric connection portion capable of coming into contact with the memory contact 4*b*, and can be engaged with the memory holder 4**.

In the present exemplary embodiment, the memory holder 4 is disposed on a side surface located at an end with respect to the attachment direction (the insertion direction) of the intermediate transfer unit 100 to the apparatus main body 2 among the outside surfaces of the cleaning container 184 in the belt cleaning device 108. On the other hand, the connection section 5 is fixed to the frame body (not illustrated) in the apparatus main body 2. As illustrated in FIG. 2, the connection section 5 is disposed at the position where the memory contact **4*b* of the memory board 4*a* and the contact spring 5*a* come into contact with each other so that the memory contact 4*b* and the contact spring 5*a* can become conductive with each other in the state where the intermediate transfer unit 100 is attached to the apparatus main body 2. The contact spring 5*a* is connected to a detection circuit 6 (FIG. 6) disposed in the apparatus main body 2 via a wire harness (not illustrated) disposed in the apparatus main body 2. The detection circuit 6 is composed of a reading/writing circuit as a reading/writing section. The detection circuit (reading/writing circuit) 6 as a detection section forming detection means can detect (read) the old/new information and the unit configuration information from the memory board 4*a* as a detection target section via the contact spring 5*a* and the memory contact 4*b***.

Consequently, in a case where the entirety of the intermediate transfer unit 100 is replaced with a new intermediate transfer unit 100, it is possible to prevent a failure from occurring by the operator forgetting to input information indicating the replacement or the operator erroneously inputting information indicating that only the belt cleaning device 108 is replaced with a new belt cleaning device 108. In a case where only the belt cleaning device 108 is replaced with a new belt cleaning device 108, it is possible to prevent a failure from occurring by the operator forgetting to input information indicating the replacement or the operator erroneously inputting information indicating that the entirety of the intermediate transfer unit 100 is replaced.

As described above, in a case where the difference between the life of the intermediate transfer belt 101 and the life of the belt cleaning device 108 is great depending on the recording materials P to be used, the belt cleaning device 108 is often more likely to be influenced by the recording materials P, and the life of the belt cleaning device 108 is often shorter. Thus, the memory board **4*a* is disposed in the belt cleaning device 108 between the belt cleaning device 108 and the belt conveyance section 109**, whereby it is possible to achieve miniaturization and low cost while obtaining excellent results.

4. Replacement Timing

In the present exemplary embodiment, the image forming apparatus 1 can provide the operator with (inform the operator of) the accumulated value of an index value regarding the usage from the start of the use of the intermediate transfer unit 100 (when the intermediate transfer unit 100 is new) as an estimate of the time to replace the intermediate transfer unit 100.

In the present exemplary embodiment, the image forming apparatus 1 separately counts the accumulated value of an index value regarding the usage from the start of the use of each of the belt cleaning device 108 and the intermediate transfer belt 101 (when each of the belt cleaning device 108 and the intermediate transfer belt 101 is new) and sets the greater accumulated value as the accumulated value of the index value regarding the usage from the start of the use of the intermediate transfer unit 100 (when the intermediate transfer unit 100 is new). The image forming apparatus 1 can provide the operator with (inform the operator of) the accumulated value of the index value regarding the usage from the start of the use of the intermediate transfer unit 100 (when the intermediate transfer unit 100 is new) as an estimate of the time to replace the intermediate transfer unit 100.

That is, in the present exemplary embodiment, in the image forming apparatus 1, a cleaning counter 71 (FIG. 6) composed of a storage section as counting means (a counting section) that counts the index value regarding the usage from the start of the use of the belt cleaning device 108 and stores the counted value (the count value) is provided. In the present exemplary embodiment, in the image forming apparatus 1, a belt counter 72 (FIG. 6) composed of a storage section as counting means (a counting section) that counts the index value regarding the usage from the start of the use of the intermediate transfer belt 101 and stores the counted value (the count value) is provided. In the present exemplary embodiment, as the index value regarding the usage from the start of the use of the belt cleaning device 108, the number of printed sheets (the number of recording materials P on which images are formed) in terms of a predetermined size is used. In the present exemplary embodiment, as the index value regarding the usage from the start of the use of the intermediate transfer belt 101, the number of printed sheets (the number of recording materials P on which images are formed) in terms of a predetermined size is used. These index values, however, may only preferably be values correlated with the usages of the belt cleaning device 108 and the intermediate transfer belt 101 associated with the operation of the image forming apparatus 1. For example, the printing time, the conveyance distance (or the number of rotations) of the intermediate transfer belt 101, or the conveyance time (or the rotation time) may be used. In the present exemplary embodiment, in the image forming apparatus 1, an intermediate transfer unit counter 73 (FIG. 6) composed of a storage section as counting means (a counting section) that stores the greater value between the count value of the cleaning counter 71 and the count value of the belt counter 72 as the index value regarding the usage from the start of the use of the intermediate transfer unit 100 is provided. In the present exemplary embodiment, the operator is provided with (informed of) the count value of the intermediate transfer unit counter 73 as an estimate of the time to replace the intermediate transfer unit 100.

In the present exemplary embodiment, every time an image is formed on a recording material P, a control section 50 (FIG. 6) of the image forming apparatus 1 causes each of the cleaning counter 71 and the belt counter 72, which are storage sections, to update (increment) and store the count value (the number of printed sheets). In the present exemplary embodiment, if the control section 50 detects that the belt cleaning device 108 is new, and detects (determines) that the belt cleaning device 108 and the belt conveyance section 109 (including the intermediate transfer belt 101) are shipped in an integrated manner, the control section 50 resets each of the count value (the number of printed sheets) of the cleaning counter 71 and the count value (the number of printed sheets) of the belt counter 72 to an initial value (zero in the present exemplary embodiment).

In the present exemplary embodiment, if the control section 50 detects that the belt cleaning device 108 is new, and detects (determines) that the belt cleaning device 108 and the belt conveyance section 109 (including the intermediate transfer belt 101) are not shipped in an integrated manner (i.e., the belt cleaning device 108 is shipped alone), the control section 50 resets the count value (the number of printed sheets) of the cleaning counter 71 to the initial value (zero in the present exemplary embodiment), and does not reset the count value (the number of printed sheets) of the belt counter 72.

In the present exemplary embodiment, according to a predetermined operation performed on an operation section 60 by the operator, the control section 50 can display the count value of the intermediate transfer unit counter 73 on the operation section 60. As described above, the displayed count value of the intermediate transfer unit counter 73 is the greater value between the count value of the cleaning counter 71 and the count value of the belt counter 72. Consequently, the operator can appropriately check the count value of the intermediate transfer unit counter 73 on the operation section 60. If a failure such as a stain on an image due to a cleaning defect occurs, the operator can replace the belt cleaning device 108 with a new belt cleaning device 108. If the operator checks the intermediate transfer unit counter 73 and finds that the count value exceeds a predetermined life value set in advance, the operator can replace the entirety of the intermediate transfer unit 100 with a new intermediate transfer unit 100. In the present exemplary embodiment, estimates of the lives of the belt cleaning device 108, the intermediate transfer belt 101, and the intermediate transfer unit 100 are set to six hundred thousand printed sheets.

Consequently, even in a case where only the belt cleaning device 108 is replaced before the intermediate transfer unit 100 reaches the end of its life because a failure such as a stain on an image due to a cleaning defect occurs, the user can use the remaining life of the intermediate transfer belt 101 that is not replaced. As a result, it is possible to prevent an increase in the running cost of the image forming apparatus 1. For example, in a case where only the belt cleaning device 108 is replaced, it is possible to prevent the operator from erroneously resetting the belt counter 72. As a result, it is possible to prevent the intermediate transfer belt 101 from being used over its life.

Based on the intermediate transfer unit counter 73, the image forming apparatus 1 may automatically inform the operator of (display) information urging the operator to replace the intermediate transfer unit 100 on the operation section 60 (or a display section of an external apparatus). For example, the control section 50 can compare the intermediate transfer unit counter 73 and a predetermined threshold set in advance and indicating the life of the intermediate transfer unit 100, and if it is determined that the count value exceeds the threshold, the control section 50 can provide the information on the operation section 60.

Although in the present exemplary embodiment, the operator performs the operation and is informed of the information (the information is displayed) on the operation section 60, in addition to or instead of this, the operator can also perform the operation and be informed of the information (the information can also be displayed) in an external apparatus such as a personal computer connected to the image forming apparatus 1.

The operator may be informed of the information not only by display, but also by the emission of light from a light-emitting unit, such as the lighting or the blinking of a warning lamp, or by the generation of a sound by a sound generation section, such as the generation of a warning sound.

For example, according to a predetermined operation of the operator, the control section 50 may be able to display each of the count value of the cleaning counter 71 and the count value of the belt counter 72 on the operation section 60 or an external apparatus.

The count value of at least one of the cleaning counter 71, the belt counter 72, and the intermediate transfer unit 73 may be stored in the memory board 4*a* disposed in the belt cleaning device 108.

5. Control Configuration

Figure 6:
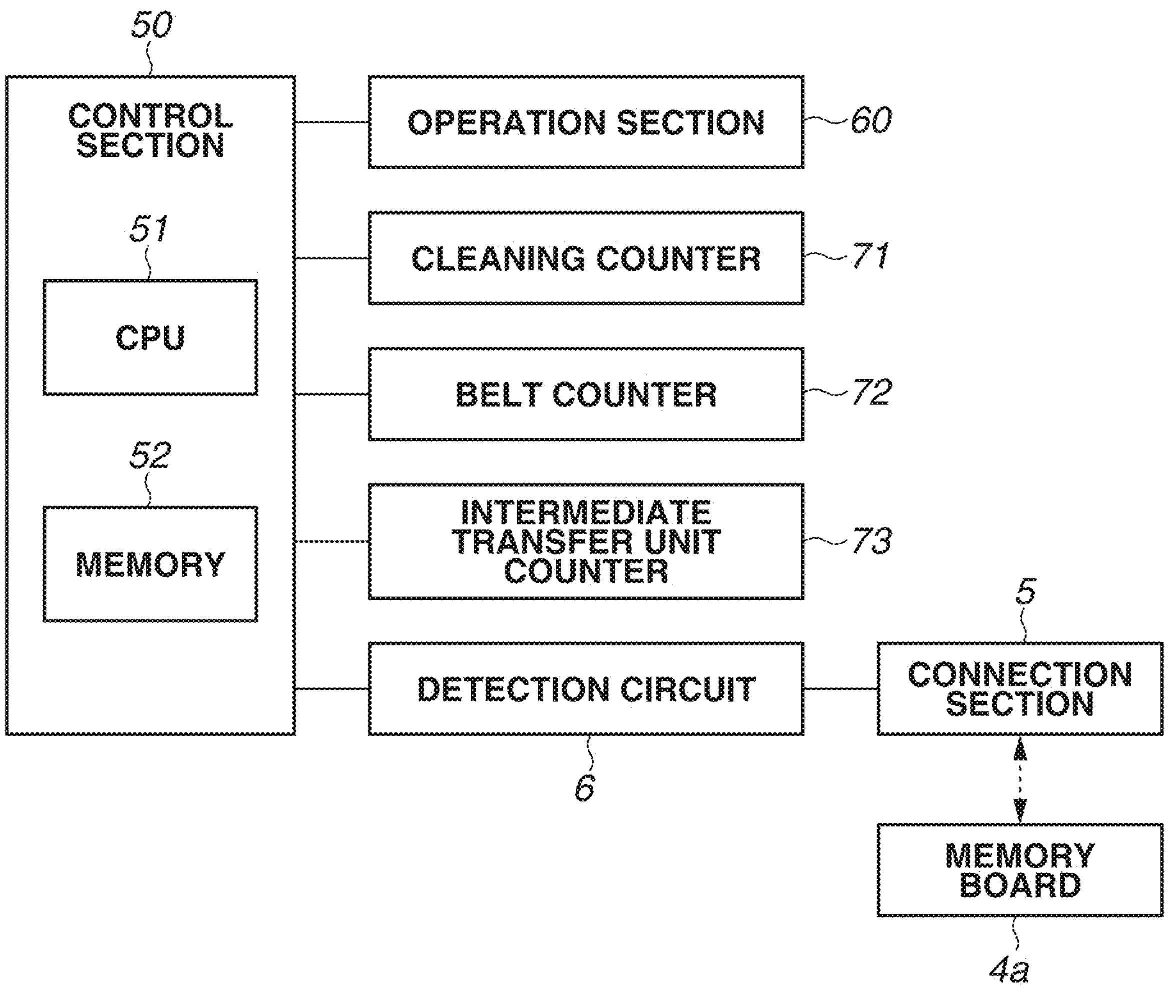
FIG. 6 is a schematic block diagram illustrating a control configuration of a main portion of the image forming apparatus.

FIG. 6 is a schematic block diagram illustrating the control configuration of a main portion of the image forming apparatus 1 according to the present exemplary embodiment. In the image forming apparatus 1, the control section (control circuit) 50 forming control means is provided. The control section 50 includes a central processing unit (CPU) 51 as an arithmetic processing section (an arithmetic processing circuit) forming arithmetic processing means that is a central element that performs arithmetic processing, a memory (storage medium) 52 such as a read-only memory (ROM) and a random-access memory (RAM) as a storage section forming a storage means, and an interface section (an input/output circuit) (not illustrated). The RAM that is a rewritable memory stores information input to the control section 50, detected information, and an arithmetic result, and the ROM stores a control program and a data table obtained in advance. The CPU 51 and the memory 52 can transfer and read data to and from each other. The interface section controls the input and output (communication) of a signal between the control section 50 and a device connected to the control section 50.

To the control section 50, the components of the image forming apparatus 1 (the image forming section S, driving devices for members regarding the conveyance of the intermediate transfer belt 101 and a recording material P, various power supplies, and various sensors) are connected.

In terms of the present exemplary embodiment, the cleaning counter 71, the belt counter 72, and the intermediate transfer unit counter 73 are connected to the control section 50. To the control section 50, the detection circuit 6 that detects whether the belt cleaning device 108 is new (the old/new information) and whether the belt cleaning device 108 and the belt conveyance section 109 (including the intermediate transfer belt 101) are shipped in an integrated manner (the unit configuration information) is connected. The detection circuit 6 is composed of a reading/writing circuit as a reading/writing section capable of reading information from the memory board 4*a* disposed in the belt cleaning device 108 and writing information to the memory board 4*a*. To the detection circuit 6, the contact spring 5*a* held by the connection section 5 and capable of electrically connecting to the memory contact 4*b* of the memory board 4*a* is connected. The detection circuit 6 inputs information read from the memory board 4*a* via the contact spring 5*a* and the memory contact 4*b* to the control section 50. The detection circuit 6 writes information to the memory board 4*a* via the contact spring 5*a* and the memory contact 4*b* under control of the control section 50. The memory contact 4*b* and the contact spring 5*a* are connected together, whereby the detection circuit 6 can read and write information from and to the memory board 4*a*. To the control section 50, the operation section (operation panel, operation screen) 60 disposed in the image forming apparatus 1 is connected. The operation section 60 includes a display section (display means) that displays information under control of the control section 50 and an input section (input means) that inputs information to the control section 50 by an operation performed by the operator such as the user or the service person. The operation section 60 may include a touch panel having the functions of the display means and the input means. To the control section 50, an image reading apparatus (not illustrated) disposed in the image forming apparatus 1 or connected to the image forming apparatus 1 or an external apparatus such as a personal computer (not illustrated) connected to the image forming apparatus 1 may be connected.

As described above, in the present exemplary embodiment, the memory holder 4 including the memory board 4*a* is disposed in the intermediate transfer unit 100, and the connection section 5 including the contact spring 5*a* for reading information in the memory board 4*a* is disposed in the apparatus main body 2. The memory board 4*a* stores at least the information regarding whether the belt cleaning device 108 is new (the "old/new information") and the information regarding whether the belt cleaning device 108 and the belt conveyance section 109 (including the intermediate transfer belt 101) are shipped in an integrated manner (the "unit configuration information"). The memory board 4*a* may additionally store information regarding the characteristic value of a component included in the intermediate transfer unit 100.

Based on information (including the absence of predetermined information) from the memory board 4*a*, the control section 50 can detect whether the belt cleaning device 108 is new. For example, the control section 50 acquires predetermined information stored in a predetermined storage area in the memory board 4*a* or detects the presence or absence of predetermined information in the predetermined storage area, and thereby can determine whether the belt cleaning device 108 is new. For example, the control section 50 acquires information indicating that the belt cleaning device 108 is new from the memory board 4*a*, and thereby can determine that the belt cleaning device 108 is new. This information is recorded in the memory board 4*a* in the step of manufacturing the intermediate transfer unit 100 or the belt cleaning device 108 or when the intermediate transfer unit 100 or the belt cleaning device 108 is shipped from the factory. In this case, if the use of the belt cleaning device 108 is started, the information may be erased or updated to information indicating that the belt cleaning device 108 is not new. The control section 50 acquires the information indicating that the belt cleaning device 108 is not new (the use of the belt cleaning device 108 is started) from the memory board 4*a*, and thereby can determine that the belt cleaning device 108 is not new. In this case, if the use of the belt cleaning device 108 is started, the information indicating that the belt cleaning device 108 is not new may be written, or the information indicating that the belt cleaning device 108 is new may be rewritten with the information indicating that the belt cleaning device 108 is not new.

Based on information (including the absence of predetermined information) from the memory board 4*a*, the control section 50 can detect (determine) whether the belt cleaning device 108 and the belt conveyance section 109 (including the intermediate transfer belt 101) are shipped in an integrated manner. For example, the control section 50 acquires predetermined information stored in a predetermined storage area in the memory board 4*a* or detects the presence or absence of predetermined information in the predetermined storage area, and thereby can determine whether the belt cleaning device 108 and the belt conveyance section 109 (including the intermediate transfer belt 101) are shipped in an integrated manner. This information is recorded in the memory board 4*a* in the step of manufacturing the intermediate transfer unit 100 or the belt cleaning device 108 or when the intermediate transfer unit 100 or the belt cleaning device 108 is shipped from the factory.

The image forming apparatus 1 executes a job that is a series of operations started according to a single start instruction for forming images on one or more recording materials P and outputting the images. The job generally includes an image forming step (an image forming operation, a print operation, and a printing operation), a pre-rotation step, an inter-paper step in a case where images are formed on a plurality of recording materials P, and a post-rotation step. The image forming step refers to a period when an electrostatic image of an image to be actually formed on a recording material P and output is formed, a toner image is formed, and the toner image is primarily transferred and secondarily transferred. An image forming time (an image forming period) refers to this period. More particularly, the timing of the Image forming time differs depending on the positions where the steps of forming an electrostatic image, forming a toner image, primarily transferring the toner image, and secondarily transferring the toner image are performed. The pre-rotation step is a period when a preparation operation before the image forming step is performed, from when a start instruction is input to when an image actually starts to be formed. The inter-paper step is a period corresponding to, when image formation is continuously performed on a plurality of recording materials P (continuous image formation), a period between the recording materials P. The post-rotation step is a period when an arrangement operation (a preparation operation) after the image forming step is performed. A non-image forming time (a non-image forming period) is a period other than the image forming time and includes the pre-rotation step, the inter-paper step, and the post-rotation step, and further includes a pre-multi-rotation step that is a preparation operation when the power supply of the image forming apparatus 1 is turned on or when the image forming apparatus 1 returns from a sleep state.

Based on information regarding the job, the control section 50 controls the components of the image forming apparatus 1 to perform an image forming operation. The information regarding the job includes a start instruction (a start signal) input from the operation section 60 or an external apparatus, information (a command signal) regarding an image forming condition such as the type of the recording material P, and image information (an image signal) input from the image reading apparatus or an external apparatus.

6. Control Procedure

Next, a further description is given of the processing when the intermediate transfer unit 100 becomes attached to the apparatus main body 2 according to the present exemplary embodiment.

In a case where the belt cleaning device 108 is replaced, then as illustrated in FIGS. 2 and 5, the operator extracts the intermediate transfer unit 100 in the state where the belt cleaning device 108 is attached to the intermediate transfer unit 100 in an integrated manner from the apparatus main body 2. The operator further detaches only the belt cleaning device 108 from the belt conveyance section 109 of the extracted intermediate transfer unit 100. Then, the operator attaches a new belt cleaning device 108 to the belt conveyance section 109. The operator inserts the intermediate transfer unit 100 to which the new belt cleaning device 108 is attached in an integrated manner into the apparatus main body 2. If the intermediate transfer unit 100 continues to be inserted into the apparatus main body 2, then as illustrated in FIG. 1, the intermediate transfer unit 100 reaches the predetermined position in the apparatus main body 2. As a result, the memory board 4*a* of the memory holder 4 disposed in the belt cleaning device 108 and the connection section 5 disposed in the apparatus main body 2 become electrically connected together by the memory contact 4*b* of the memory board 4*a* and the contact spring 5*a* of the connection section 5 coming into contact with each other. An operation in a case where the entirety of the intermediate transfer unit 100 is replaced is similar to the above, except that a new intermediate transfer unit 100 becomes attached to the apparatus main body 2 without attaching or detaching the belt cleaning device 108 to or from the belt conveyance section 109. In the present exemplary embodiment, when the intermediate transfer unit 100 becomes detached from the apparatus main body 2, the power supply of the image forming apparatus 1 is turned off. At this time, the power supply of the image forming apparatus 1 may be turned off by the operator operating a power switch, or may be turned off by the control section 50 based on the state where an opening/closing sensor (not illustrated) detects that the right door unit 3 is opened.

Figure 7:
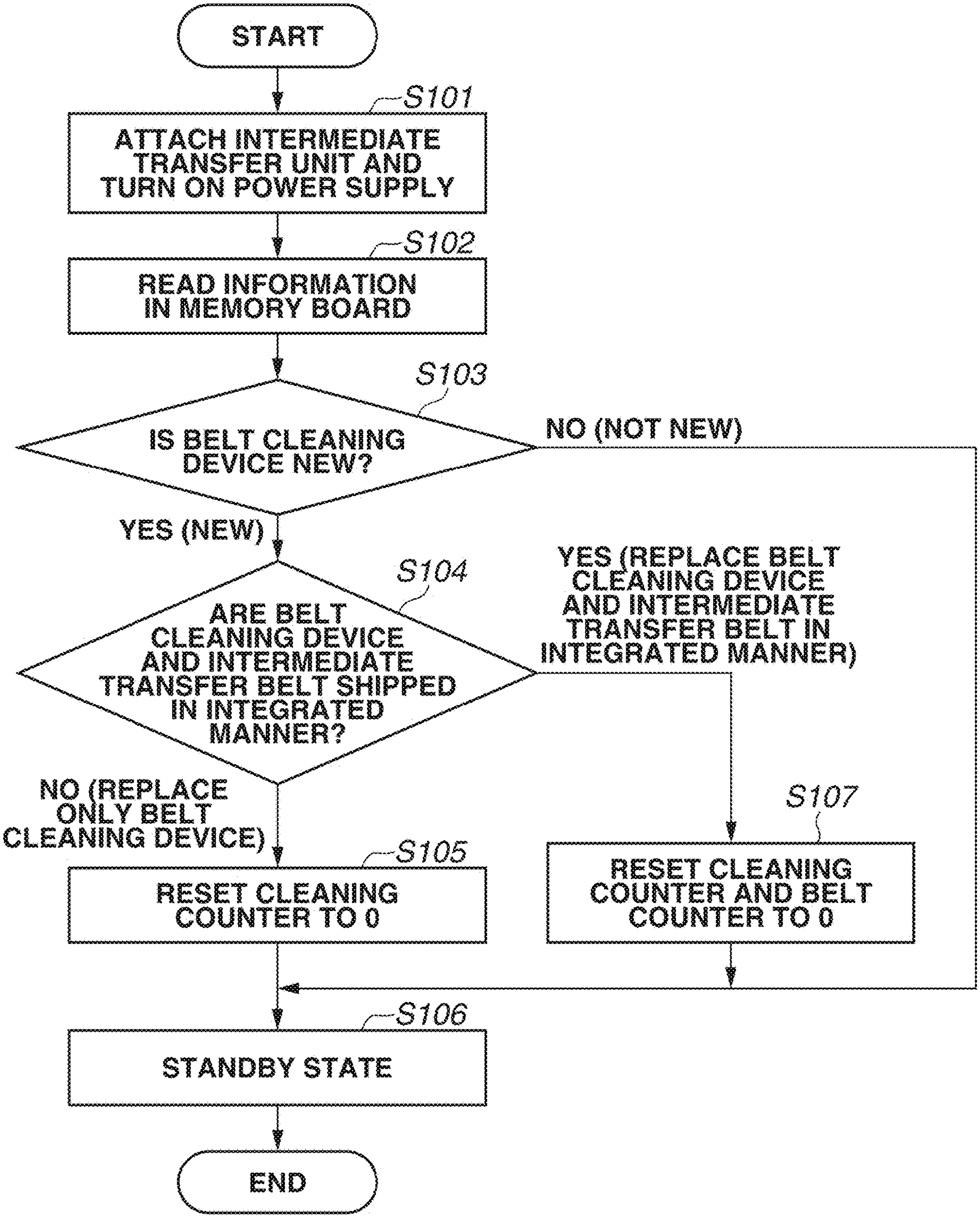
FIG. 7 is a flowchart illustrating processing when the intermediate transfer unit becomes attached to the image forming apparatus according to a first exemplary embodiment.

FIG. 7 is a flowchart illustrating the outline of the procedure of the processing when the intermediate transfer unit 100 becomes attached to the apparatus main body 2. With reference to FIG. 7, the processing procedure according to the present exemplary embodiment is described.

In step S101, the intermediate transfer unit 100 becomes attached to the apparatus main body 2, and the power supply of the image forming apparatus 1 is turned on. In step S102, at a predetermined timing before a printing operation is performed for the first time after that, the control section 50 causes the detection circuit 6 to check (read) information in the memory board 4*a*. At this time, the power supply of the image forming apparatus 1 may be turned on by the operator operating the power switch, or may be turned on by the control section 50 based on the state where the opening/closing sensor (not illustrated) detects that the right door unit 3 is closed. In step S103, the control section 50 reads the old/new information in the information acquired from the memory board 4*a* by the detection circuit 6 and determines whether the belt cleaning device 108 is new. If it is determined in step S103 that the belt cleaning device 108 is new (YES in step S103), then in step S104, next, the control section 50 reads the unit configuration information in the information acquired from the memory board 4*a* by the detection circuit 6 and determines whether the belt cleaning device 108 and the belt conveyance section 109 (including the intermediate transfer belt 101) are shipped in an integrated manner.

If it is determined in step S104 that the belt cleaning device 108 and the belt conveyance section 109 (including the intermediate transfer belt 101) are not shipped in an integrated manner (NO in step S104), then in step S105, the control section 50 resets the cleaning counter 71 to the initial value (zero in the present exemplary embodiment). If it is determined in step S103 that the belt cleaning device 108 is new, and it is determined in step S104 that the belt cleaning device 108 and the belt conveyance section 109 (including the intermediate transfer belt 101) are not shipped in an integrated manner, this indicates that the belt cleaning device 108 is new, but the belt conveyance section 109 (the intermediate transfer belt 101) is not new. Then, in step S106, the control section 50 brings the image forming apparatus 1 into a standby state where the image forming apparatus 1 waits for a job.

If it is determined in step S104 that the belt cleaning device 108 and the belt conveyance section 109 (including the intermediate transfer belt 101) are shipped in an integrated manner (YES in step S104), then in step S107, the control section 50 resets each of the cleaning counter 71 and the belt counter 72 to the initial value (zero in the present exemplary embodiment). If it is determined in step S103 that the belt cleaning device 108 is new, and it is determined in step S104 that the belt cleaning device 108 and the belt conveyance section 109 (including the intermediate transfer belt 101) are shipped in an integrated manner, this indicates that both the belt cleaning device 108 and the belt conveyance section 109 (the intermediate transfer belt 101) are new. Then, in step S106, the control section 50 brings the image forming apparatus 1 into a standby state where the image forming apparatus 1 waits for a job.

If it is determined in step S103 that the belt cleaning device 108 is not new (NO in step S103), the processing proceeds to step S106. If it is determined in step S103 that the belt cleaning device 108 is not new, this indicates that both the belt cleaning device 108 and the belt conveyance section 109 (the intermediate transfer belt 101) are not new.

7. Effects

As described above, in the present exemplary embodiment, an image forming apparatus 1 includes a rotatable image bearing member (photosensitive drum) 11 that bears a toner image, and an intermediate transfer unit 100 that transfers the toner image formed on the image bearing member 11 to a recording material P and includes an intermediate transfer member (intermediate transfer belt) 101 that can make a circling movement and conveys the toner image primarily transferred from the image bearing member 11 to secondarily transfer the toner image to the recording material P, and a cleaning device (belt cleaning device) 108 that cleans the intermediate transfer member 101. In the present exemplary embodiment, in the image forming apparatus 1, the intermediate transfer unit 100 is attachable to and detachable from an apparatus main body 2 of the image forming apparatus 1, the cleaning device 108 is attachable to and detachable from a unit main body (belt conveyance section) 109 of the intermediate transfer unit 100, a storage section (memory board) 4*a* attachable to and detachable from the unit main body 109 together with the cleaning device 108 is disposed in the cleaning device 108, a control section 50 capable of reading information from the storage section 4*a* is disposed in the apparatus main body 2, and the control section 50 can read, from the storage section 4*a*, first information (old/new information) regarding whether the cleaning device 108 is new, and second information (unit configuration information) regarding whether the intermediate transfer member 101 attached to the intermediate transfer unit 100 is new in a case where the intermediate transfer unit 100 to which a new cleaning device 108 is attached becomes attached to the apparatus main body 2. In the present exemplary embodiment, the image forming apparatus 1 includes first counting means (cleaning counter) 71 that counts an index value regarding the usage of the cleaning device 108 from when the cleaning device 108 is new, and second counting means (belt counter) 72 that counts an index value regarding the usage of the intermediate transfer member 101 from when the intermediate transfer member 101 is new, and when the intermediate transfer unit 100 becomes attached to the apparatus main body 2, and (a) in a case where the first information indicates that the cleaning device 108 is new, and the second information indicates that the intermediate transfer member 101 attached to the intermediate transfer unit 100 is not new, the control section 50 performs control to reset the counted value of the first counting means 71 to an initial value and so as not to reset the counted value of the second counting means 72, and (b) in a case where the first information indicates that the cleaning device 108 is new, and the second information indicates that the intermediate transfer member 101 attached to the intermediate transfer unit 100 is new, the control section 50 performs control to reset the counted value of the first counting means 71 to the initial value and reset the counted value of the second counting means 72 to an initial value. In the present exemplary embodiment, the control section 50 performs control to execute a process for providing information regarding the usage of the intermediate transfer unit 100 based on the counted value of the first counting means 71 and the counted value of the second counting means 72. Particularly, in the present exemplary embodiment, the control section 50 performs control to execute the process for informing the operator of the information regarding the usage of the intermediate transfer unit 100 based on the greater counted value between the counted value of the first counting means 71 and the counted value of the second counting means 72.

As described above, according to the present exemplary embodiment, it is possible to replace only the belt cleaning device 108 in the intermediate transfer unit 100. Thus, it is possible to continue to use the intermediate transfer belt 101 in the state where the intermediate transfer belt 101 can be used, and it is possible to prevent an increase in the running cost of the image forming apparatus 1. According to the present exemplary embodiment, the apparatus main body 2 can automatically detect whether the belt cleaning device 108 and the belt conveyance section 109 (including the intermediate transfer belt 101) are replaced in an integrated manner. Thus, the operator themselves do not need to perform a special operation such as inputting information indicating that the intermediate transfer unit 100 is replaced, and it is possible to reduce the time and effort taken for maintenance. According to the present exemplary embodiment, in a case where only the belt cleaning device 108 is replaced, it is possible to prevent the operator from erroneously resetting the belt counter 72. Thus, it is possible to provide the operator with (inform the operator of) an estimate of the appropriate time to replace the intermediate transfer unit 100 as the count value of the intermediate transfer unit counter 73, and it is possible to prevent the intermediate transfer belt 101 from being used over its life.

Next, a second exemplary embodiment of the present disclosure is described. The basic configuration and operation of an image forming apparatus according to the present exemplary embodiment are similar to those of the image forming apparatus according to the first exemplary embodiment. Thus, in the image forming apparatus according to the present exemplary embodiment, a component having a function or configuration similar or corresponding to that of the image forming apparatus according to the first exemplary embodiment is designated by the same sign as that in the first exemplary embodiment, and is not described in detail.

1. Overview of Present Exemplary Embodiment

In the present exemplary embodiment, in a case where the belt cleaning device 108 or the intermediate transfer unit 100 is replaced with a new belt cleaning device 108 or a new intermediate transfer unit 100, the image forming apparatus 1 executes predetermined initial control.

The edge portion of the free end portion of the cleaning blade 181 abuts the intermediate transfer belt 101. Although the cleaning blade 181 is formed of an elastic body, the difference between the life of the intermediate transfer belt 101 and the life of the belt cleaning device 108 may be great depending on the recording materials P to be used. In such a case, the belt cleaning device 108 is often more likely to be influenced by the recording materials P, and the life of the belt cleaning device 108 is often shorter. Thus, as described above, the operator such as the user or the service person can check a stain on an image and replace the belt cleaning device 108. In the present exemplary embodiment, if the control section 50 of the image forming apparatus 1 detects that the belt cleaning device 108 is replaced with a new belt cleaning device 108 based on a signal from the detection circuit 6, the control section 50 performs control to execute predetermined initial control.

In the present exemplary embodiment, the control section 50 executes supply control (a supply operation) that is control for supplying toner as a lubricant to an abutment portion between the cleaning blade 181 and the intermediate transfer belt 101 as the initial control. The supply operation executed as the initial control is also referred to as "initial supply control". This is because a frictional force acting on the abutment portion between the cleaning blade 181 and the intermediate transfer belt 101 may be greater in a case where the cleaning blade 181 is new than in a case where the cleaning blade 181 is not new. If the frictional force acting on the abutment portion between the new cleaning blade 181 and the intermediate transfer belt 101 is excessive, there is a possibility that a failure such as the turning up of the cleaning blade 181 occurs.

In the present exemplary embodiment, the initial supply control is performed as follows. If the control section 50 detects that a new belt cleaning device 108 becomes attached to the apparatus main body 2, then before a printing operation is performed for the first time after that, the control section 50 performs the initial supply control for supplying toner to the abutment portion between the cleaning blade 181 and the intermediate transfer belt 101. In the initial supply control, in at least one of the plurality of image forming units S, a band-like or linear predetermined toner image extending along a direction (a main scanning direction) approximately orthogonal to the moving direction of the surface of the photosensitive drum 11 (and the intermediate transfer belt 101) is formed on the photosensitive drum 11. The predetermined toner image is also referred to as a "supplied toner image". In the present exemplary embodiment, the supplied toner image is formed through a charging step, an exposure step, and a development step in a process similar to that during the normal image forming time. The supplied toner image formed on the photosensitive drum 11 is transferred onto the intermediate transfer belt 101 in the primary transfer portion T1. The supplied toner image transferred onto the intermediate transfer belt 101 is supplied to the abutment portion between the cleaning blade 181 and the intermediate transfer belt 101 by the rotation of the intermediate transfer belt 101. When the supplied toner image passes through the secondary transfer portion T2, a voltage having the same polarity as the normal charge polarity of the toner (a polarity opposite to the charge polarity of the toner in the secondary transfer) is applied to the secondary transfer outer roller 16, thereby preventing the supplied toner image from becoming attached to the secondary transfer outer roller 16. Alternatively, a method for separating the secondary transfer outer roller 16 from the intermediate transfer belt 101 when the supplied toner image passes through the secondary transfer portion T2 may be disposed. In the present exemplary embodiment, the supplied toner image is a band-like or linear toner image over the approximate entirety of an image forming area (an area where a toner image can be borne) in the direction (the width direction) approximately orthogonal to the moving direction of the surface of the photosensitive drum 11 (and the intermediate transfer belt 101). This toner image, however, may be one or more toner images formed with any lengths in the direction approximately orthogonal to the moving direction of the surface of the photosensitive drum 11 (and the intermediate transfer belt 101). For example, in the present exemplary embodiment, the supplied toner image is a band-like black toner image of which the length in the approximately orthogonal direction is a length over the approximate entirety of the image forming area and of which the length in a direction (a sub-scanning direction) approximately parallel to the moving direction of the surface of the photosensitive drum 11 (and the intermediate transfer belt 101) is 10 millimeters (mm). In the present exemplary embodiment, the density of the supplied toner image is FFH (the highest density level (a solid image) among 256 levels from 0 to 255). Using the lubricity of the toner (or an external additive of the toner) supplied to the abutment portion between the cleaning blade 181 and the intermediate transfer belt 101 in the initial supply control, it is possible to reduce the frictional force acting on the abutment portion between the cleaning blade 181 and the intermediate transfer belt 101. Consequently, it is possible to prevent the occurrence of a failure such as the turning up of the cleaning blade 181.

On the other hand, in the present exemplary embodiment, if the operation of (the application of a current to) the image forming apparatus 1 is started in the state where the belt cleaning device 108 that is not new is attached to the apparatus main body 2, the initial supply control is not executed before a printing operation is performed for the first time after that. For example, this corresponds to a case where the belt cleaning device 108 that is not new becomes attached again to the apparatus main body 2 or a case where the power supply of the image forming apparatus 1 is turned on in the state where the belt cleaning device 108 that is not new is attached to the apparatus main body 2.

Further, in the present exemplary embodiment, if the control section 50 detects that the belt cleaning device 108 is new, and detects (determines) that the belt cleaning device 108 and the belt conveyance section 109 (including the intermediate transfer belt 101) are shipped in an integrated manner, the control section 50 executes active transfer voltage control (ATVC) control that is adjustment control (an adjustment operation) for correcting a primary transfer bias as the initial control in addition to the initial supply control. In this case, since the intermediate transfer belt 101 is replaced, this is to acquire information regarding the electrical resistance of the new intermediate transfer belt 101 after the replacement. The ATVC control is the following control. When a non-image portion on the photosensitive drum 11 is passing through the primary transfer portion T1, a primary transfer voltage subjected to constant current control using a predetermined current value set in advance is applied to the primary transfer portion T1 (the primary transfer roller 106), and the value of a voltage generated at this time is detected. Consequently, it is possible to acquire information regarding the electrical resistance of the intermediate transfer belt 101. During an image forming time (in primary transfer), the primary transfer voltage is subjected to constant voltage control using a voltage value determined based on the value of the previously generated voltage or the result of arithmetically processing the value of the previously generated voltage. Consequently, even in a case where the intermediate transfer belt 101 is replaced, for example, it is possible to prevent an overcurrent from flowing from the primary transfer portion T1 to the photosensitive drum 11, thereby reducing a memory for the photosensitive drum 11.

Additionally, it is possible to apply an appropriate primary transfer voltage during an image forming time (in primary transfer). Thus, it is possible to stably output an excellent image.

In the present exemplary embodiment, the ATVC control is individually performed in synchronization in each of the image forming sections SY, SM, SC, and SK. A primary transfer voltage subjected to constant voltage control using a predetermined voltage value set in advance may be applied to the primary transfer portion T1 (the primary transfer roller 106), the value of a current generated at this time may be detected, and information regarding the electrical resistance of the intermediate transfer belt 101 may be acquired. Although in the present exemplary embodiment, the ATVC control for acquiring information regarding the electrical resistance of the intermediate transfer belt 101 in the primary transfer portion T1 has been described, similar ATVC control may be performed in the secondary transfer portion T2, thereby acquiring information regarding the electrical resistance of the intermediate transfer belt 101 (correcting a secondary transfer voltage).

Figure 8:
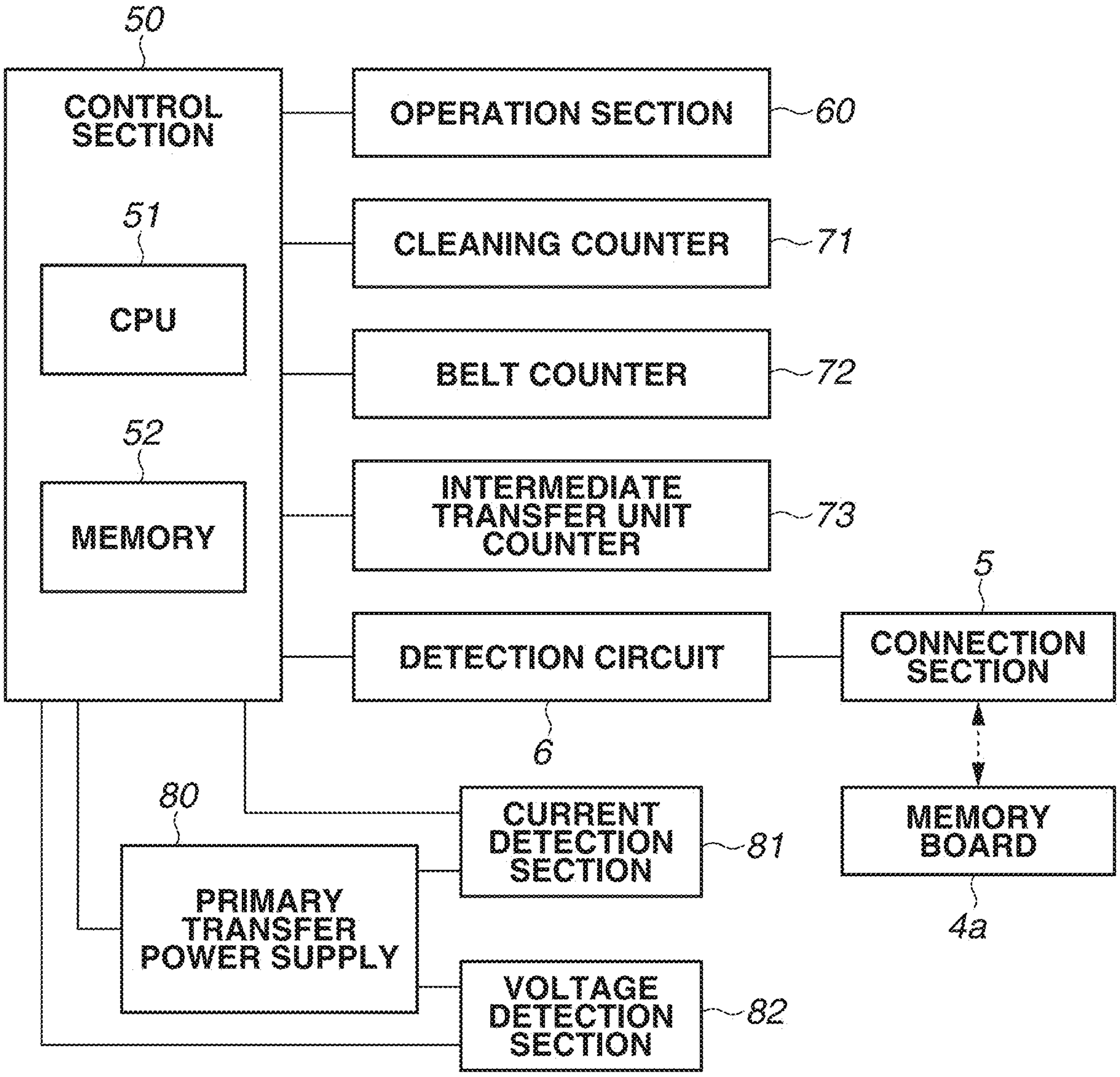
FIG. 8 is a schematic block diagram illustrating a control configuration of a main portion of the image forming apparatus in another example.

FIG. 8 is a schematic block diagram illustrating the control configuration of a main portion of the image forming apparatus 1 according to the present exemplary embodiment. The control configuration illustrated in FIG. 8 is approximately similar to the control configuration illustrated in FIG. 6 described in the first exemplary embodiment. In the control configuration illustrated in FIG. 8, however, a current detection section (current detection circuit) 81 as a current detection means that detects the output current value of primary transfer power supply 80 and a voltage detection section (voltage detection circuit) 82 as voltage detection means that detects the output voltage of the primary transfer power supply 80 are provided. The current detection section 81 detects the current value of a current flowing through the primary transfer portion T1 (the primary transfer roller 106 and the primary transfer power supply 80) when the primary transfer power supply 80 applies a voltage to the primary transfer portion T1 (the primary transfer roller 106). The voltage detection section 82 detects the voltage value of a voltage applied to the primary transfer portion T1 (the primary transfer roller 106) by the primary transfer power supply 80 (output from the primary transfer power supply 80). Each of the current detection section 81 and the voltage detection section 82 inputs a signal (information) indicating the detection result to the control section 50. Although not illustrated, in the present exemplary embodiment, the primary transfer power supply 80, the current detection section 81, and the voltage detection section 82 are independently provided for each of the image forming sections SY, SM, SC, and SK.

In the present exemplary embodiment, in a case where a new belt cleaning device 108 becomes attached to the apparatus main body 2, the control section 50 executes the initial supply control as the initial control during a non-image forming time. Further, in the present exemplary embodiment, in a case where the entirety of a new intermediate transfer unit 100 becomes attached to the apparatus main body 2, the control section 50 executes the initial supply control and the ATVC control as the initial control during a non-image forming time.

As described above, in the present exemplary embodiment, in a case where the belt cleaning device 108 or the intermediate transfer unit 100 is replaced with a new belt cleaning device 108 or a new intermediate transfer unit 100, the image forming apparatus 1 performs predetermined initial control. At this time, if a configuration is employed in which the operator inputs information indicating that a unit to be replaced is replaced as in a conventional method, and in a case where only the belt cleaning device 108 is replaced in the intermediate transfer unit 100, the operator can forget to input information indicating the replacement. In this case, the initial control that should be performed in a case where the belt cleaning device 108 is replaced with a new belt cleaning device 108 may not be correctly performed, and this may cause a failure such as the turning up of the cleaning blade 181. In a case where only the belt cleaning device 108 is replaced, there can be a case where the operator erroneously inputs information indicating that the intermediate transfer unit 100 is replaced. In this case, the initial control that should be performed in a case where the intermediate transfer belt 101 is replaced may unnecessarily be executed, and this may cause a failure such as an increase in downtime.

2. Control Procedure

Figure 9:
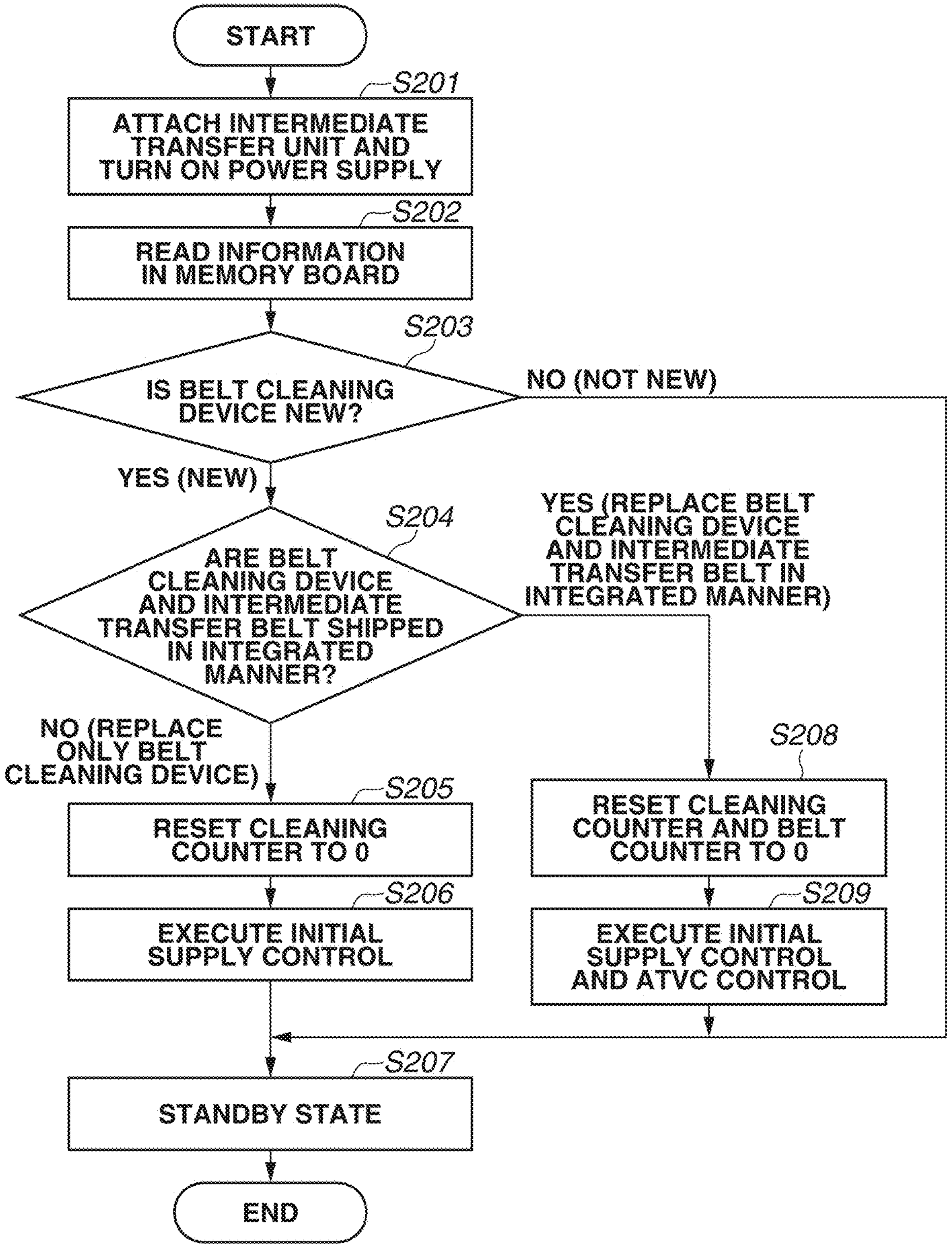
FIG. 9 is a flowchart illustrating processing when an intermediate transfer unit becomes attached to an image forming apparatus according to a second exemplary embodiment.

FIG. 9 is a flowchart illustrating the outline of the procedure of the processing when the intermediate transfer unit 100 becomes attached to the apparatus main body 2 according to the present exemplary embodiment. With reference to FIG. 9, the processing procedure according to the present exemplary embodiment is described.

In step S201, the intermediate transfer unit 100 becomes attached to the apparatus main body 2, and the power supply of the image forming apparatus 1 is turned on. In step S202, at a predetermined timing before a printing operation is performed for the first time after that, the control section 50 causes the detection circuit 6 to check (read) information in the memory board 4*a*. In step S203, the control section 50 reads the old/new information in the information acquired from the memory board 4*a* by the detection circuit 6 and determines whether the belt cleaning device 108 is new. If it is determined in step S203 that the belt cleaning device 108 is new (YES in step S203), then in step S204, next, the control section 50 reads the unit configuration information in the information acquired from the memory board 4*a* by the detection circuit 6 and determines whether the belt cleaning device 108 and the belt conveyance section 109 (including the intermediate transfer belt 101) are shipped in an integrated manner.

If it is determined in step S204 that the belt cleaning device 108 and the belt conveyance section 109 (including the intermediate transfer belt 101) are not shipped in an integrated manner (NO in step S204), then in step S205, the control section 50 resets the cleaning counter 71 to the initial value (zero in the present exemplary embodiment). In step S206, the control section 50 executes the initial supply control as the initial control. Then, in step S207, the control section 50 brings the image forming apparatus 1 into a standby state where the image forming apparatus 1 waits for a job.

If it is determined in step S204 that the belt cleaning device 108 and the belt conveyance section 109 (including the intermediate transfer belt 101) are shipped in an integrated manner (YES in step S204), then in step S208, the control section 50 resets each of the cleaning counter 71 and the belt counter 72 to the initial value (zero in the present exemplary embodiment). In step S209, the control section 50 executes the initial supply control as the initial control and then executes the ATVC control as the initial control.

Then, in step S207, the control section 50 brings the image forming apparatus 1 into a standby state where the image forming apparatus 1 waits for a job.

If it is determined in step S203 that the belt cleaning device 108 is not new (NO in step S203), the processing proceeds to step S207.

3. Effects

As described above, in the present exemplary embodiment, when the intermediate transfer unit 100 becomes attached to the apparatus main body 2, the control section 50 performs control to execute predetermined control based on first information (old/new information) and second information (unit configuration information) before image formation is performed for the first time using the intermediate transfer unit 100. In the present exemplary embodiment, when the intermediate transfer unit 100 becomes attached to the apparatus main body 2, and in a case where the first information indicates that the cleaning device 108 is new, the control section 50 performs control to execute control for supplying a predetermined toner image transferred from the image bearing member 11 to the intermediate transfer member 101 to an abutment portion between the cleaning member 181 included in the cleaning device 108 and the surface of the intermediate transfer member 101 as the predetermined control. In the present exemplary embodiment, when the intermediate transfer unit 100 becomes attached to the apparatus main body 2, and (a) in a case where the first information indicates that the cleaning device 108 is new, and the second information indicates that the intermediate transfer member 101 attached to the intermediate transfer unit 100 is not new, the control section 50 performs control to execute predetermined first control before image formation is performed for the first time using the intermediate transfer unit 100, and (b) in a case where the first information indicates that the cleaning device 108 is new, and the second information indicates that the intermediate transfer member 101 attached to the intermediate transfer unit 100 is new, the control section 50 performs control to execute predetermined second control before image formation is performed for the first time using the intermediate transfer unit 100. In the present exemplary embodiment, the first control is control for supplying a predetermined toner image transferred from the image bearing member 11 to the intermediate transfer member 101 to the abutment portion between the cleaning member 181 included in the cleaning device 108 and the surface of the intermediate transfer member 101. In the present exemplary embodiment, the second control is control for acquiring information regarding the electrical resistance of the intermediate transfer member 101 by applying a voltage to the intermediate transfer member 101. In the present exemplary embodiment, in a case where the second control is executed, the control section 50 performs control to also execute the first control.

As described above, according to the present exemplary embodiment, the apparatus main body 2 can automatically detect that the belt cleaning device 108 is replaced with a new belt cleaning device 108. Thus, the operator themselves do not need to perform a special operation such as inputting information indicating that the belt cleaning device 108 is replaced. Thus, it is possible to prevent the situation where the initial control that should be performed in a case where the belt cleaning device 108 is replaced is not appropriately performed because the operator forgets to input information. It is possible to reduce the time and effort taken for maintenance. According to the present exemplary embodiment, the apparatus main body 2 can automatically detect whether the belt cleaning device 108 and the belt conveyance section 109 (including the intermediate transfer belt 101) are replaced in an integrated manner. Thus, it is possible to automatically execute the initial control that should be performed when the intermediate transfer belt 101 is replaced. According to the present exemplary embodiment, in a case where only the belt cleaning device 108 is replaced, it is possible to prevent the operator from erroneously resetting the belt counter 72. Thus, it is possible to prevent the unnecessary execution of the initial control that should be performed when the intermediate transfer belt 101 is replaced.

Next, a third exemplary embodiment of the present disclosure is described. The basic configuration and operation of an image forming apparatus according to the present exemplary embodiment are similar to those of the image forming apparatus according to the first exemplary embodiment. Thus, in the image forming apparatus according to the present exemplary embodiment, a component having a function or configuration similar or corresponding to that of the image forming apparatus according to the first exemplary embodiment is designated by the same sign as that in the first exemplary embodiment, and is not described in detail.

1. Lateral Streak-Like Image Defect

In a case where the intermediate transfer belt 101 and the belt cleaning device 108 according to the present exemplary embodiment are used, and after a certain number of images are output particularly under a high-temperature environment, if the intermediate transfer belt 101 and the belt cleaning device 108 are left for a certain time and image formation is performed again, a lateral streak-like image defect (in the main scanning direction) may occur. As a result of diligent consideration of the present inventor, it is considered that this lateral streak-like image defect occurs by the following mechanism.

Figure 10A:
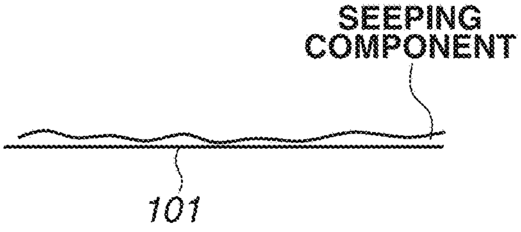
FIGS. 10A to 10F are diagrams illustrating an occurrence mechanism of a lateral streak-like image defect.
Figure 10B:
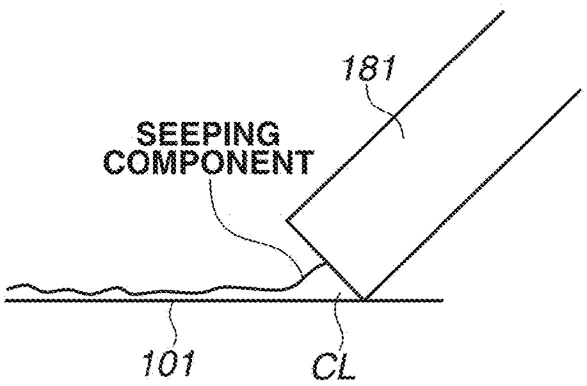
Figure 10C:
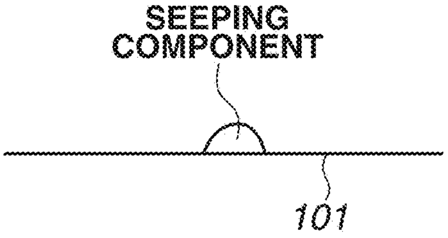
Figure 10D:
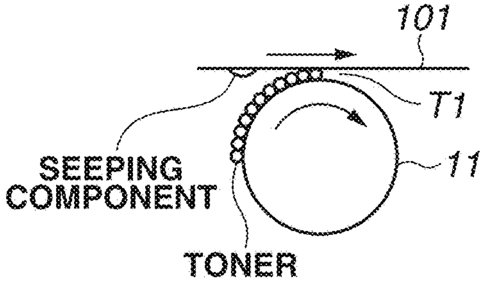
Figure 10E:
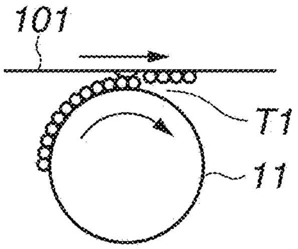
Figure 10F:
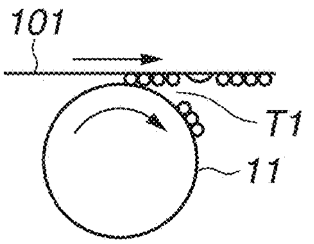

FIGS. 10A to 10F are schematic diagrams for describing the occurrence mechanism of a lateral streak-like image defect. First, as illustrated in FIG. 10A, the component of the surface layer of the intermediate transfer belt 101 activates particularly under a high-temperature environment and seeps to the surface of the intermediate transfer belt 101. Next, as illustrated in FIG. 10B, the component that seeps (also referred to as the "seeping component") is scraped by the cleaning blade 181 of the belt cleaning device 108. If the intermediate transfer belt 101 is left for a certain time in this state, then as illustrated in FIG. 10C, the seeping component is firmly fixed, cannot be scraped by the cleaning blade 181, and passes through a cleaning portion CL that is the abutment portion between the cleaning blade 181 and the intermediate transfer belt 101. When image formation is performed next time, then as illustrated in FIGS. 10D and 10E, the seeping component thus firmly fixed onto the intermediate transfer belt 101 reaches the abutment portion (primary transfer portion) T1 between the photosensitive drum 11 and the intermediate transfer belt 101. As a result, as illustrated in FIG. 10F, a failure in the transfer of a toner image from the photosensitive drum 11 to the intermediate transfer belt 101 occurs in an attachment portion of the seeping component and leads to a lateral streak-like image defect.

2. Relationship Between Lateral Streak-Like Image Defect and Temperature

As described above, if the temperature of the intermediate transfer belt 101 rises due to a rise in the atmospheric temperature, the component of the surface layer of the intermediate transfer belt 101 activates and is likely to seep to the surface of the intermediate transfer belt 101. Thus, a lateral streak-like image defect is also likely to occur. Table 1 illustrates the results of an experiment that examined the relationship between an atmospheric temperature T and the presence or absence of the occurrence of a lateral streak-like image defect. The presence or absence of the occurrence of an image defect was checked by continuously performing image formation on 500 A4-size sheets under a 30° C. (degrees Celsius) environment using the image forming apparatus 1 having the configuration of the present exemplary embodiment, leaving the image forming apparatus 1 for an hour, and then outputting black solid images on five A3-size sheets. "○" indicates that an image defect did not occur, and "x" indicates that an image defect occurred. The method for checking the presence or absence of the occurrence of an image defect was also similar in experiments that obtained the results in tables 2 and 3 (however, the temperature was changed in the experiment that obtained the results in table 1).

TABLE 1

| Atmospheric Temperature T [° C.] | Presence or Absence of Occurrence of Image Defect |
|---|---|
| 10 | Present |
| 15 | Present |
| 20 | Present |
| 23 | Present |
| 25 | Absent |
| 27 | Absent |
| 30 | Absent |
| 35 | Absent |

From table 1, it is understood that if the atmospheric temperature T is high, particularly, if the atmospheric temperature T is 25° C. or above, a lateral streak-like image defect is also likely to occur.

3. Relationship between Lateral Streak-Like Image Defect and Usage of Intermediate Transfer Belt The occurrence situation of a lateral streak-like image defect is correlated with the usage of the intermediate transfer belt 101. Table 2 illustrates the results of an experiment that examined the relationship between the usage of the intermediate transfer belt 101 (the count value of the belt counter 72) and the surface roughness of the intermediate transfer belt 101, and the presence or absence of the occurrence of a lateral streak-like image defect. The method for checking the presence or absence of the occurrence of an image defect was similar to that in the experiment that obtained the results in table 1. Table 2 illustrates the results at 25° C. As the surface roughness of the intermediate transfer belt 101, a ten-point average roughness Rz (corresponding standard: JIS B0601 1994) of the surface (the surface that bears a toner image) of the intermediate transfer belt 101 was measured. The ten-point average roughness Rz refers to a value obtained by extracting only a reference length from a roughness curve in the direction of the average line of the roughness curve, obtaining the sum of the average value of the absolute values of elevations (Yp) of the highest peak to the fifth highest peak measured in a direction from the average line to the vertical magnification in this extracted portion and the average value of the absolute values of elevations (Yv) from the lowest valley to the fifth lowest valley measured in the same direction, and representing the value of the sum in micrometers (μm). The ten-point average roughness Rz can be measured using Surfcom (model: 1400D, manufactured by Tokyo Seimitsu Co., Ltd.) as a surface roughness measuring device or using a measuring device already correlated with the surface roughness measuring device. The measurement conditions were as follows.

Magnification: vertical 10000, horizontal 50
Evaluated length: 4 mm
Gauge: 2 μm (spherical)
Feeding speed: 0.15 mm/sec
Cut-off value: 0.8 mm
Cut-off filter: Gaussian

TABLE 2

| Belt Counter | Rz [μm] | Presence or Absence of Occurrence of Image Defect |
|---|---|---|
| 0 | 0.05 | Absent |
| 5000 | 0.12 | Absent |
| 10000 | 0.15 | Absent |
| 20000 | 0.18 | Absent |
| 30000 | 0.2 | Absent |
| 40000 | 0.24 | Absent |
| 50000 | 0.26 | Present |
| 60000 | 0.31 | Present |
| 70000 | 0.35 | Present |
| 100000 | 0.55 | Present |

From table 2, it is understood that a lateral streak-like image defect is correlated with the ten-point average roughness Rz of the surface of the intermediate transfer belt 101 and the usage of the intermediate transfer belt 101 (the count value of the belt counter 72). From table 2, it is understood that if the ten-point average roughness Rz of the surface of the intermediate transfer belt 101 is greater than or equal to a predetermined threshold, a lateral streak-like image defect does not occur. In other words, it is understood that if the usage of the intermediate transfer belt 101 (the count value of the belt counter 72) is greater than or equal to a predetermined threshold, a lateral streak-like image defect does not occur.

It is considered that this is due to the following reason. That is, the greater the count value of the belt counter 72 of the intermediate transfer belt 101 is, the greater the surface roughness (the ten-point average roughness Rz) of the intermediate transfer belt 101 is due to rubbing against toner in the abutment portion between the intermediate transfer belt 101 and the belt cleaning device 108 or the photosensitive drum 11. If the surface roughness (the ten-point average roughness Rz) of the intermediate transfer belt 101 is greater than a certain value, a seeping component is likely to slip through the cleaning portion CL (i.e., is less likely to be scraped).

In the image forming apparatus 1 according to the present exemplary embodiment, the relationship where the surface roughness (the ten-point average roughness Rz) of the intermediate transfer belt 101 becomes greater with an increase in the count value of the belt counter 72 is substantially always the same. Thus, it is possible to guess the surface roughness (the ten-point average roughness Rz) of the intermediate transfer belt 101 and the likelihood of the occurrence of a lateral streak-like image defect from the count value of the belt counter 72 of the intermediate transfer belt 101.

4. Supply Control

In the present exemplary embodiment, the image forming apparatus 1 executes supply control (a supply operation) that is control for supplying toner as a lubricant to the abutment portion between the cleaning blade 181 and the intermediate transfer belt 101 at a predetermined execution frequency according to the use of the intermediate transfer belt 101. In the supply control, in at least one of the plurality of image forming units S, a predetermined band-like toner image (a "supplied toner image") extending along the direction (the main scanning direction) approximately orthogonal to the moving direction of the surface of the photosensitive drum 11 (and the intermediate transfer belt 101) is formed on the photosensitive drum 11. In the present exemplary embodiment, the supplied toner image is formed through a charging step, an exposure step, and a development step in a process similar to that during the normal image forming time. The supplied toner image formed on the photosensitive drum 11 by the supply control is supplied to the cleaning portion CL that in the abutment portion between the cleaning blade 181 and the intermediate transfer belt 101, similarly to the supplied toner image formed on the photosensitive drum 11 by the initial supply control described in the second exemplary embodiment. In the present exemplary embodiment, in the supply control, as the supplied toner image, a black solid image having a length of 50 mm is supplied to the cleaning portion CL without transferring the black solid image to a recording material P in the circumferential direction of the intermediate transfer belt 101. In the present exemplary embodiment, the supplied toner image has a length over the approximate entirety of the image forming area (the area where a toner image can be borne) in the longitudinal direction of the photosensitive drum 11 (the width direction of the intermediate transfer belt 101). That is, in the present exemplary embodiment, the supplied toner image is a band-like image extending in the width direction of the intermediate transfer belt 101. Consequently, it is possible to supply toner over an approximately entire area in the longitudinal direction of the cleaning blade 181 of the belt cleaning device 108. The supplied toner image formed by the supply control may be in another form, similarly to the initial supply control described in the second exemplary embodiment.

In the present exemplary embodiment, the control section 50 executes the supply control during a non-image forming time at a predetermined timing (execution frequency). The supply control can be executed at any timing such as a pre-multi-rotation step, a pre-rotation step, an inter-paper step, or a post-rotation step so long as the supply control is executed during a non-image forming time. For example, in a case where the supply control is executed in an inter-paper step, the supply control can be executed by widening the interval between sheets (the interval between a preceding recording material P and a next recording material P in the conveyance direction of recording materials P), where desired.

Table 3 illustrates the results of examining the relationship between the usage of the intermediate transfer belt 101 (the count value of the belt counter 72) and the presence or absence of the occurrence of a lateral streak-like image defect in a case where the execution frequency of the supply control was changed. In the present exemplary embodiment, the execution frequency of the supply control is represented by the number of executions of the supply control per unit number of printed sheets as a predetermined period correlated with the usage of the intermediate transfer belt 101. The method for checking the presence or absence of the occurrence of an image defect was similar to that in the experiments that obtained the results in tables 1 and 2. Table 3 illustrates the results at 25° C.

TABLE 3

| | | Execution Frequency of Initial Supply Control | | | | | |
|---|---|---|---|---|---|---|---|
| | | 1 Execution/ 10 Sheets | 1 Execution/ 25 Sheets | 1 Execution/ 50 Sheets | 1 Execution/ 100 Sheets | 1 execution/ 150 sheets | No Supply |
| Belt Counter | 0 | Present | Present | Absent | Absent | Absent | Absent |
| | 5000 | Present | Present | Present | Absent | Absent | Absent |
| | 10000 | Present | Present | Present | Absent | Absent | Absent |
| | 20000 | Present | Present | Present | Present | Absent | Absent |
| | 30000 | Present | Present | Present | Present | Absent | Absent |
| | 40000 | Present | Present | Present | Present | Present | Absent |
| | 50000 | Present | Present | Present | Present | Present | Present |

From table 3, it is understood that the higher the execution frequency of the supply control is, i.e., the greater the amount of supply of toner to the cleaning portion CL per predetermined period (per unit number of printed sheets in the present exemplary embodiment) correlated with the usage of the intermediate transfer belt 101 is, the less likely an image defect is to occur. It is considered that this is because the supply of toner to the cleaning portion CL mixes the toner or an external additive with a seeping component, and the seeping component is less likely to be firmly fixed to the intermediate transfer belt 101.

From table 3, it is understood that the greater the count value of the belt counter 72 of the intermediate transfer belt 101 is, i.e., the greater the surface roughness (the ten-point average roughness Rz) of the intermediate transfer belt 101 is, the smaller the amount of supply of toner to the cleaning portion CL that is desired to prevent a lateral streak-like image defect is. It is considered that this is because, as described above, the surface roughness (the ten-point average roughness Rz) of the intermediate transfer belt 101 becomes greater, and a seeping component is likely to slip through the cleaning portion CL (i.e., is less likely to be scraped). From table 3, it is understood that in the configuration of the present exemplary embodiment, for example, if the count value of the belt counter 72 is greater than or equal to 50000 sheets, a lateral streak-like image defect due to a seeping component is less likely to occur without executing the supply control.

Thus, in the present exemplary embodiment, the control section 50 performs control to change the execution frequency of the supply control based on the count value of the belt counter 72. For example, based on the results in table 3, it is possible to perform control to change the execution frequency of the supply control as illustrated in table 4. Consequently, it is possible to prevent an increase in the toner consumption amount or downtime.

TABLE 4

| Belt Counter N | Execution Frequency of Initial Supply Control |
|---|---|
| N < 5000 | 1 Execution/25 sheets |
| 5000 ≤ N < 20000 | 1 Execution/50 sheets |
| 20000 ≤ N < 40000 | 1 Execution/100 sheets |
| 40000 ≤ N < 50000 | 1 Execution/150 sheets |
| 50000 ≤ N | Not executed |

Figure 11:
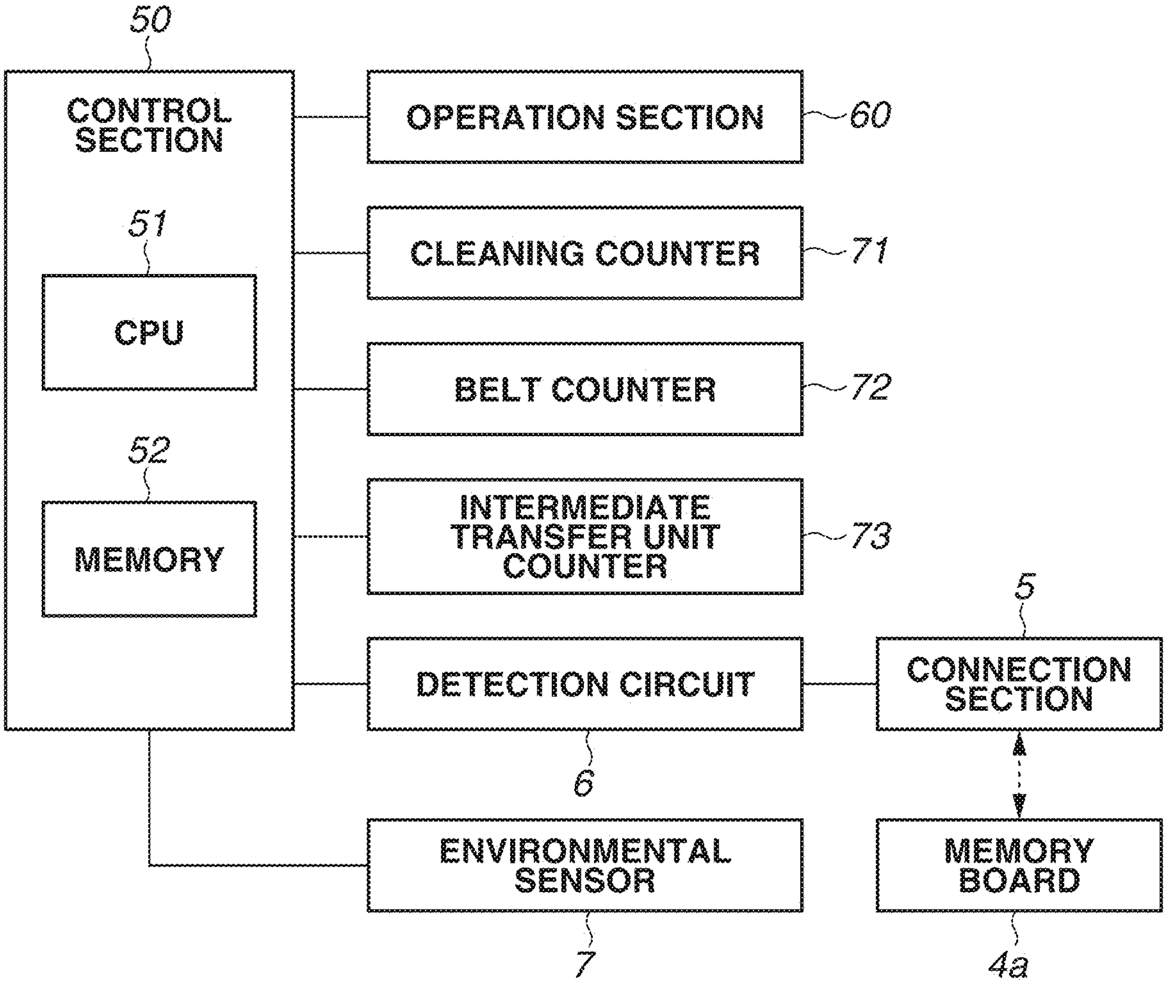
FIG. 11 is a schematic block diagram illustrating a control configuration of a main portion of the image forming apparatus in another example.

As described above, a lateral streak-like image defect due to a seeping component is less likely to occur in a case where the atmospheric temperature is low than in a case where the atmospheric temperature is high. Thus, the control section 50 may perform control to change the execution frequency of the supply control based on the atmospheric temperature. For example, if the atmospheric temperature is 25° C. or above, the supply control is executed at the above execution frequency. If the atmospheric temperature is less than 25° C., for example, it is possible to make the execution frequency of the supply control in each division of the count value of the belt counter 72 in a case where the atmospheric temperature is 25° C. lower than in a case where the atmospheric temperature is 25° C. If the atmospheric temperature is less than 25° C., the supply control may not be executed. FIG. 11 is a schematic block diagram illustrating the control configuration of a main portion of the image forming apparatus 1 in this case.

The control configuration illustrated in FIG. 11 is approximately similar to the control configuration illustrated in FIG. 6 described in the first exemplary embodiment. In the control configuration illustrated in FIG. 11, however, an environmental sensor 7 as environment detection means is provided. The environmental sensor 7 detects an environment that is at least one of the temperature and the humidity of at least one of the inside and the outside of the image forming apparatus 1. In the present exemplary embodiment, the environmental sensor 7 includes a temperature sensor as temperature detection means that detects at least the temperature of the inside of the image forming apparatus 1. The environmental sensor 7 inputs information (a signal) indicating the detection result to the control section 50.

5. Control Procedure

Figure 12:
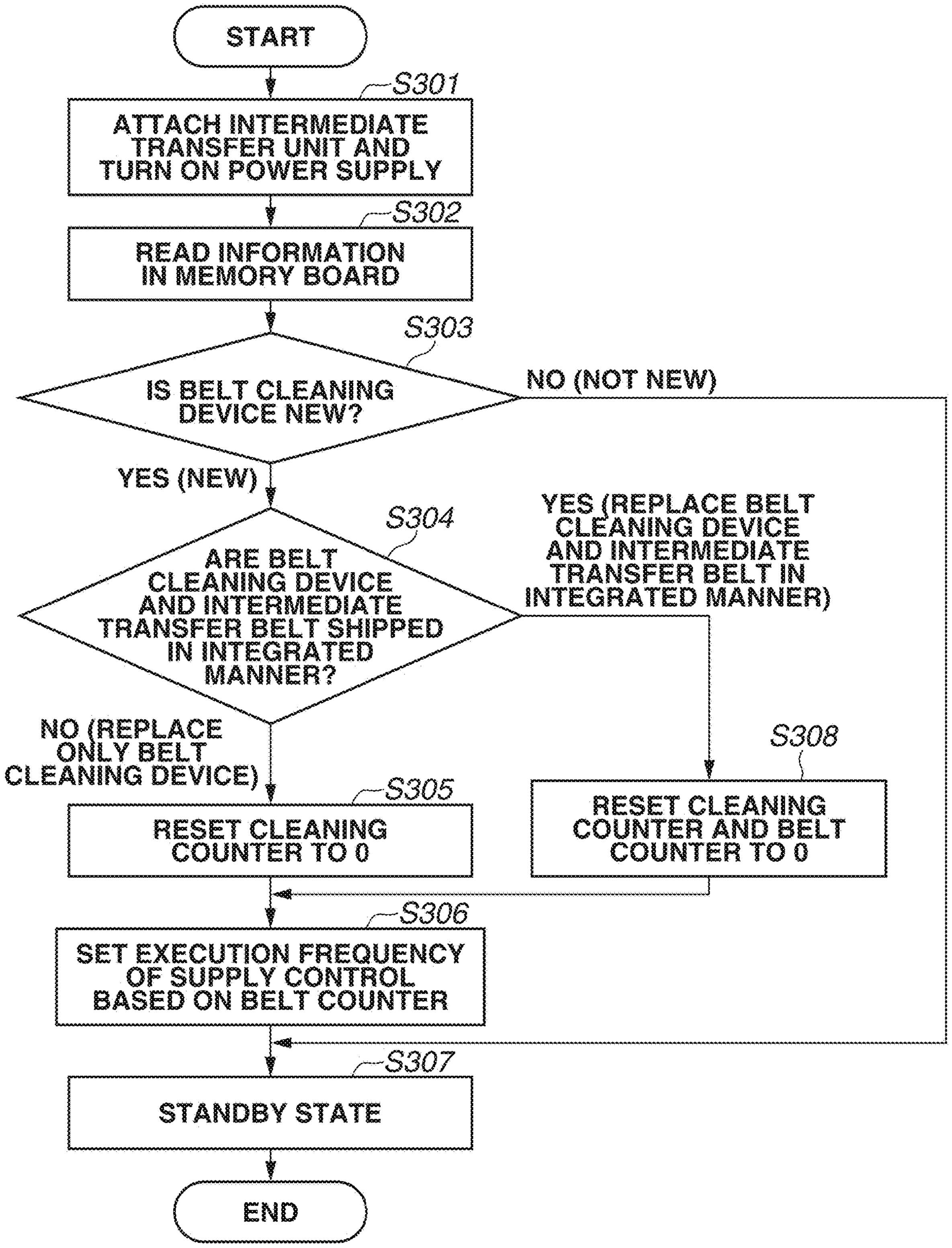
FIG. 12 is a flowchart illustrating processing when an intermediate transfer unit becomes attached to an image forming apparatus according to a third exemplary embodiment.

FIG. 12 is a flowchart illustrating the outline of the procedure of the processing when the intermediate transfer unit 100 becomes attached to the apparatus main body 2 according to the present exemplary embodiment. With reference to FIG. 12, the processing procedure according to the present exemplary embodiment is described.

In step S301, the intermediate transfer unit 100 becomes attached to the apparatus main body 2, and the power supply of the image forming apparatus 1 is turned on. In step S302, at a predetermined timing before a printing operation is performed for the first time after that, the control section 50 causes the detection circuit 6 to check (read) information in the memory board 4*a*. In step S303, the control section 50 reads the old/new information in the information acquired from the memory board 4*a* by the detection circuit 6 and determines whether the belt cleaning device 108 is new. If it is determined in step S303 that the belt cleaning device 108 is new (YES in step S303), then in step S304, next, the control section 50 reads the unit configuration information in the information acquired from the memory board 4*a* by the detection circuit 6 and determines whether the belt cleaning device 108 and the belt conveyance section 109 (including the intermediate transfer belt 101) are shipped in an integrated manner.

If it is determined in step S304 that the belt cleaning device 108 and the belt conveyance section 109 (including the intermediate transfer belt 101) are not shipped in an integrated manner (NO in step S304), then in step S305, the control section 50 resets the cleaning counter 71 to the initial value (zero in the present exemplary embodiment). If, on the other hand, it is determined in step S304 that the belt cleaning device 108 and the belt conveyance section 109 (including the intermediate transfer belt 101) are shipped in an integrated manner (YES in step S304), then in step S308, the control section 50 resets each of the cleaning counter 71 and the belt counter 72 to the initial value (zero in the present exemplary embodiment).

In step S306, the control section 50 sets the execution frequency of the supply control based on the count value of the belt counter 72 maintained without being reset in step S305 or reset in step S308. That is, if the count value of the belt counter 72 is maintained without being reset in step S305, the control section 50 does not change the execution frequency of the supply control. If the count value of the belt counter 72 is reset in step S308, the control section 50 changes the execution frequency of the supply control according to the updated count value of the belt counter 72.

Then, in step S307, the control section 50 brings the image forming apparatus 1 into a standby state where the image forming apparatus 1 waits for a job. If it is determined in step S303 that the belt cleaning device 108 is not new (NO in step S303), the processing proceeds to step S307.

6. Effects

As described above, in the present exemplary embodiment, the control section 50 can perform control to execute supply control for supplying a predetermined toner image transferred from the image bearing member 11 to the intermediate transfer member 101 to an abutment portion between the cleaning member 181 included in the cleaning device 108 and the surface of the intermediate transfer member 101 during a non-image forming time. Based on the counted value of the second counting means (belt counter) 72, the control section 50 performs control to change the amount of toner to be supplied to the abutment portion by the supply control per predetermined period correlated with the usage of the intermediate transfer member 101. The image forming apparatus 1 may include environment detection means (environmental sensor) 7 that detects an environment. In this case, based on the counted value of the second counting means 72 and the detection result of the environment detection means 7, the control section 50 can perform control to change the amount of toner to be supplied to the abutment portion by the supply control per predetermined period correlated with the usage of the intermediate transfer member 101.

As described above, according to the present exemplary embodiment, the apparatus main body 2 can automatically detect whether the belt cleaning device 108 and the belt conveyance section 109 (including the intermediate transfer belt 101) are replaced in an integrated manner. Thus, when the intermediate transfer belt 101 is replaced, it is possible to appropriately reset the belt counter 72 and execute the supply operation at an appropriate execution frequency according to the usage of the intermediate transfer belt 101. According to the present exemplary embodiment, in a case where only the belt cleaning device 108 is replaced, it is possible to prevent the operator from erroneously resetting the belt counter 72. Thus, it is possible to prevent the supply operation from being unnecessarily frequently executed. As described above, according to the present exemplary embodiment, it is possible to supply an appropriate amount of supply toner to the cleaning portion CL according to the usage of the intermediate transfer belt 101, thereby preventing the occurrence of a lateral streak-like image defect and forming an excellent image. According to the present exemplary embodiment, it is possible to avoid performing the supply control too frequently, thereby preventing an increase in the toner consumption amount or downtime.

Although in the present exemplary embodiment, the execution frequency of the supply control is set based on the count value of the number of printed sheets counted by the belt counter 72, the present disclosure is not limited to this. The execution frequency of the supply control may be set based on any of predetermined counter information, predetermined conveyance distance information, and predetermined period use information so long as the information is an index value correlated with the usage of the intermediate transfer belt 101.

Although in the present exemplary embodiment, the amount of supply of toner to the cleaning portion CL is changed by changing the execution frequency of the supply control, the present disclosure is not limited to this. The amount of supply of toner to the cleaning portion CL may be changed by changing the size of the supplied toner image in the supply control in one execution (the width of the toner band in the conveyance direction or the width of the toner band in a direction approximately orthogonal to the conveyance direction) or the density of supply toner.

Next, a fourth exemplary embodiment of the present disclosure is described. The basic configuration and operation of an image forming apparatus according to the present exemplary embodiment are similar to those of the image forming apparatus according to the first exemplary embodiment. Thus, in the image forming apparatus according to the present exemplary embodiment, a component having a function or configuration similar or corresponding to that of the image forming apparatus according to the first exemplary embodiment is designated by the same sign as that in the first exemplary embodiment, and is not described in detail.

1. Post-Rotation Toner Band

In the case of the intermediate transfer belt 101 including the coating layer for securing the release properties of toner as in the present exemplary embodiment, the component of the surface layer of the intermediate transfer belt 101 may become attached to the photosensitive drum 11, and a lateral streak-like image defect may occur. That is, after image formation ends, the state where the intermediate transfer belt 101 and the photosensitive drum 11 abut each other is maintained. At this time, in a case where the intermediate transfer belt 101 is in the early phase of its use, such as a case where the intermediate transfer belt 101 is new, the component of the surface layer of the intermediate transfer belt 101 may become attached to the photosensitive drum 11 and hinder the formation of a toner image, whereby a lateral streak-like image defect may occur. A lateral streak-like image defect due to such a chemical attack is likely to occur in the image forming section SK for black in a case where the stretched form of the intermediate transfer belt 101 is the form in the monochrome image printing state (FIG. 4C) in the printing standby state, for example, to shorten the time from the giving of an instruction to start printing a monochrome image to the output of the image. Also, in another image forming section S, in a case where the image forming apparatus 1 stops in the state where the photosensitive drum 11 and the intermediate transfer belt 101 abut each other, there is a possibility that the lateral streak-like image defect occurs.

Accordingly, a predetermined toner image is made present between the photosensitive drum 11 and the intermediate transfer belt 101 in the state where the photosensitive drum 11 abuts the intermediate transfer belt 101 while the image forming apparatus 1 is stopped. Consequently, it is possible to prevent a seeping component from becoming attached to the surface of the photosensitive drum 11 by leaving the photosensitive drum 11 and the intermediate transfer belt 101 for a long time in direct contact with each other. For example, before the photosensitive drum 11 and the intermediate transfer belt 101 are stopped after a post-rotation step, a band-like halftone image or solid image is formed on the photosensitive drum 11 in the state where the photosensitive drum 11 abuts the intermediate transfer belt 101 while the image forming apparatus 1 is stopped. For example, this image is formed in the approximate entirety of the image forming area (the area where a toner image can be borne) (the approximate entirety of an area where the photosensitive drum 11 and the intermediate transfer belt 101 abut each other) along the width direction of the intermediate transfer belt 101 (the rotational axis direction of the photosensitive drum 11). The photosensitive drum 11 and the intermediate transfer belt 101 are stopped so that this image is present between the photosensitive drum 11 and the intermediate transfer belt 101 in an abutment portion between the photosensitive drum 11 and the intermediate transfer belt 101. This image is referred to as a "post-rotation toner band". In the present exemplary embodiment, the post-rotation toner band (a spacer image) is formed between the photosensitive drum 11K for black and the intermediate transfer belt 101. This post-rotation toner band can become attached to both the surfaces of the photosensitive drum 11 and the intermediate transfer belt 101, but is removed by the drum cleaning device 15 and the belt cleaning device 108 in a pre-rotation step when image formation is performed after that.

Figure 13:
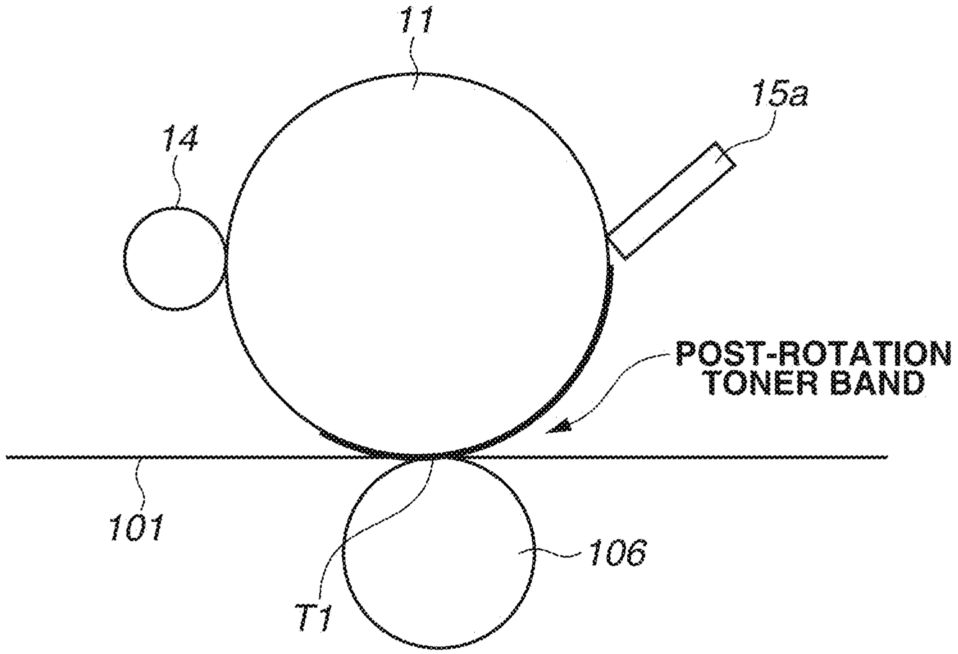
FIG. 13 is a schematic diagram illustrating a stop position of a post-rotation toner band on a photosensitive drum.

FIG. 13 is a schematic diagram illustrating the stop position of the post-rotation toner band on the photosensitive drum 11. As illustrated in FIG. 13, to prevent the occurrence of a lateral streak-like image defect, the operation of the image forming apparatus 1 is stopped so that the post-rotation toner band remains on the photosensitive drum 11 after image formation ends. Specifically, the primary transfer roller 106 is brought into the state where the primary transfer roller 106 abuts the photosensitive drum 11 via the intermediate transfer belt 101. Then, the post-rotation toner band is disposed on the photosensitive drum 11 between a position opposed to the primary transfer roller 106 and a position opposed to a cleaning blade 15*a* of the drum cleaning device 15.

However, a phenomenon where the component of the surface layer of the intermediate transfer belt 101 becomes attached to the photosensitive drum 11 is likely to occur during a predetermined period when the usage from the start of the use of the intermediate transfer belt 101 is relatively small. Thus, it is desirable to form the post-rotation toner band according to the usage of the intermediate transfer belt 101 (the count value of the belt counter 72). Consequently, it is possible to prevent the occurrence of the lateral streak-like image defect while preventing an increase in the toner consumption amount.

In the present exemplary embodiment, the enabling or disabling of the execution of control for forming the post-rotation toner band is changed based on the count value of the belt counter 72. That is, in the present exemplary embodiment, as illustrated in table 5, if the count value of the belt counter 72 is less than 50000 sheets, since there is a possibility that the lateral streak-like image defect due to the chemical attack occurs, the post-rotation toner band is formed. On the other hand, in the present exemplary embodiment, as illustrated in table 5, if the count value of the belt counter 72 is greater than or equal to 50000 sheets, since the possibility that the lateral streak-like image defect due to the chemical attack occurs is sufficiently low, the post-rotation toner band is not formed.

TABLE 5

| Belt Counter N | Formation of Post-Rotation Toner Band |
|---|---|
| N1 < 50000 | Executed |
| N1 ≥ 50000 | Not executed |

As described above, in the present exemplary embodiment, for example, if both the belt cleaning device 108 and the belt conveyance section 109 (including the intermediate transfer belt 101) are new, the control for forming the post-rotation toner band is executed. If, on the other hand, the belt cleaning device 108 is new, and the belt conveyance section 109 is not new, and for example, the usage of the intermediate transfer belt 101 from the early phase of its use (when the intermediate transfer belt 101 is new) is greater than a predetermined usage, the control for forming the post-rotation toner band is not executed. As described above, it is possible to form the post-rotation toner band at an appropriate moment according to the usage of the intermediate transfer belt 101. Consequently, it is possible to prevent the post-rotation toner band from being unnecessarily formed and reduce the toner consumption amount.

2. Control Procedure

Figure 14:
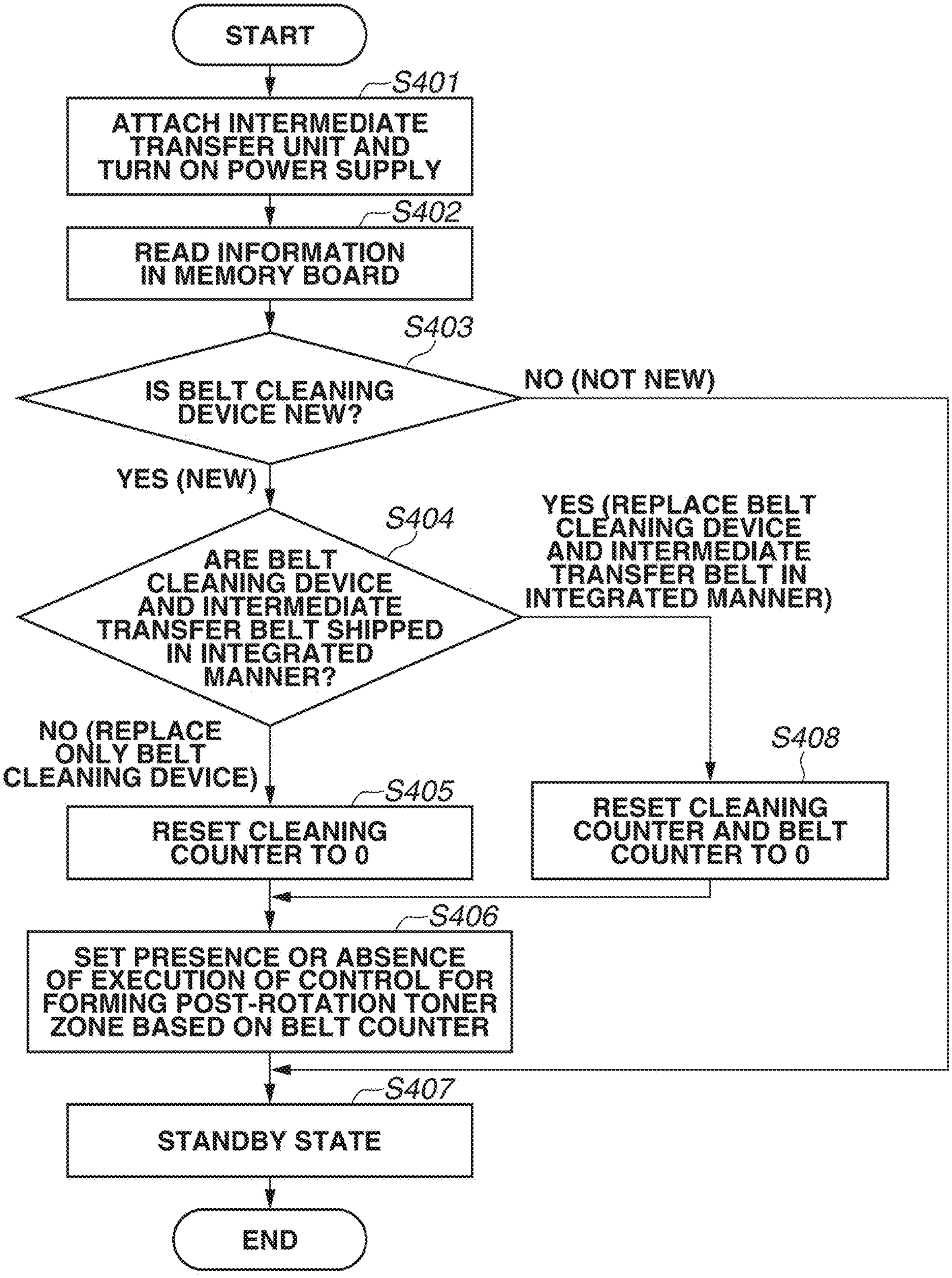
FIG. 14 is a flowchart illustrating processing when an intermediate transfer unit becomes attached to an image forming apparatus according to a fourth exemplary embodiment.

FIG. 14 is a flowchart illustrating the outline of the procedure of the processing when the intermediate transfer unit 100 becomes attached to the apparatus main body 2 according to the present exemplary embodiment. With reference to FIG. 14, the processing procedure according to the present exemplary embodiment is described.

In step S401, the intermediate transfer unit 100 becomes attached to the apparatus main body 2, and the power supply of the image forming apparatus 1 is turned on. In step S402, at a predetermined timing before a printing operation is performed for the first time after that, the control section 50 causes the detection circuit 6 to check (read) information in the memory board 4*a*. In step S403, the control section 50 reads the old/new information in the information acquired from the memory board 4*a* by the detection circuit 6 and determines whether the belt cleaning device 108 is new. If it is determined in step S403 that the belt cleaning device 108 is new (YES in step S403), then in step S404, next, the control section 50 reads the unit configuration information in the information acquired from the memory board 4*a* by the detection circuit 6 and determines whether the belt cleaning device 108 and the belt conveyance section 109 (including the intermediate transfer belt 101) are shipped in an integrated manner.

If it is determined in step S404 that the belt cleaning device 108 and the belt conveyance section 109 (including the intermediate transfer belt 101) are not shipped in an integrated manner (NO in step S404), then in step S405, the control section 50 resets the cleaning counter 71 to the initial value (zero in the present exemplary embodiment). If, on the other hand, it is determined in step S404 that the belt cleaning device 108 and the belt conveyance section 109 (including the intermediate transfer belt 101) are shipped in an integrated manner (YES in step S404), then in step S408, the control section 50 resets each of the cleaning counter 71 and the belt counter 72 to the initial value (zero in the present exemplary embodiment).

In step S406, the control section 50 sets the presence or absence of the execution of the control for forming the post-rotation toner band based on the count value of the belt counter 72 maintained without being reset in step S405 or reset in step S408. That is, if the count value of the belt counter 72 is maintained without being reset in step S405, the control section 50 does not change the setting of the enabling or disabling of the execution of the control for forming the post-rotation toner band. If the count value of the belt counter 72 is reset in step S408, the control section 50 changes the presence or absence of the execution of the control for forming the post-rotation toner band according to the updated count value of the belt counter 72.

Then, in step S407, the control section 50 brings the image forming apparatus 1 into a standby state where the image forming apparatus 1 waits for a job. If it is determined in step S403 that the belt cleaning device 108 is not new (NO in step S403), the processing proceeds to step S407.

3. Effects

As described above, in the present exemplary embodiment, when the image bearing member 11 and the intermediate transfer member 101 are stopped after image formation, the control section 50 can perform control to place a predetermined toner image formed on the image bearing member 11 between the image bearing member 11 and the intermediate transfer member 101 and stop the image bearing member 11 and the intermediate transfer member 101 in the state where the intermediate transfer member 101 abuts the image bearing member 11 through the predetermined toner image. The control section 50 performs control to change the enabling or disabling of the formation of the predetermined toner image based on the counted value of the second counting means (belt counter) 72.

As described above, according to the present exemplary embodiment, the apparatus main body 2 can automatically detect whether the belt cleaning device 108 and the belt conveyance section 109 (including the intermediate transfer belt 101) are replaced in an integrated manner. Thus, when the intermediate transfer belt 101 is replaced, it is possible to appropriately reset the belt counter 72 and execute the control for forming the post-rotation toner band at an appropriate moment according to the usage of the intermediate transfer belt 101. According to the present exemplary embodiment, in a case where only the belt cleaning device 108 is replaced, it is possible to prevent the operator from erroneously resetting the belt counter 72. Thus, it is possible to prevent the control for forming the post-rotation toner band from being unnecessarily executed. As described above, according to the present exemplary embodiment, it is possible to form the post-rotation toner band at an appropriate moment according to the usage of the intermediate transfer belt 101, thereby preventing the occurrence of a lateral streak-like image defect and forming an excellent image. According to the present exemplary embodiment, it is possible to avoid forming the post-rotation toner band at an unnecessary moment, thereby preventing an increase in the toner consumption amount.

Although in the present exemplary embodiment, the presence or absence of the formation of the post-rotation toner band is set based on the count value of the number of printed sheets counted by the belt counter 72, the present disclosure is not limited to this. The enabling or disabling of the formation of the post-rotation toner band may be set based on any of predetermined counter information, predetermined conveyance distance information, and predetermined period use information so long as the information is an index value correlated with the usage of the intermediate transfer belt 101.

[Others]

While the present disclosure has been described above based on specific exemplary embodiments, the present disclosure is not limited to the above exemplary embodiments.

The above exemplary embodiments can be carried out by optionally combining some or all of the exemplary embodiments. For example, all or some of the control for providing the operator with (informing the operator of) the information regarding the usage of the intermediate transfer unit according to the first exemplary embodiment, the initial control according to the second exemplary embodiment, the supply control according to the third exemplary embodiment, and the control for forming the post-rotation toner band according to the fourth exemplary embodiment may be carried out.

Although in the above exemplary embodiments, the initial supply control in a case where the belt cleaning device is replaced and the initial supply control and the ATVC control in a case where the intermediate transfer unit is replaced have been illustrated as examples of the initial control, the initial control is not limited to these. The initial control may be any control desired to be executed in a case where the belt cleaning device or the intermediate transfer unit is replaced, typically, before image formation is executed for the first time. For example, in a case where the intermediate transfer unit is replaced, control for measuring the characteristics such as the surface property and the perimeter of the intermediate transfer belt in addition to the electrical resistance value of the intermediate transfer belt may be performed as the initial control.

Although in the above exemplary embodiments, the memory holder is provided at the position at the end of the belt cleaning device when the intermediate transfer unit becomes attached to the apparatus main body, the present disclosure is not limited to this. The memory holder may be provided at any position where the memory holder becomes attached to and detached from the belt conveyance section together with the belt cleaning device.

The photosensitive member is not limited to a drum-like member, and may be an endless belt-like member. The intermediate transfer member is not limited to an endless belt-like member, and for example, may be a drum-like member formed by tightly stretching a sheet on a frame body.

According to the present disclosure, it is possible to replace only a cleaning device in an intermediate transfer unit and also appropriately perform processing according to the replacement of only the cleaning device or the replacement of the entirety of the intermediate transfer unit.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-171007, filed Sep. 30, 2023, which is hereby incorporated by reference herein in its entirety.

What is claimed is:

1. An image forming apparatus comprising:

an image forming section configured to form a toner image;

an intermediate transfer unit including an intermediate transfer member, the intermediate transfer member being configured to be rotated and to bear the toner image;

a unit main body disposed to be attachable to and detachable from an image forming apparatus main body and configured to rotatably support the intermediate transfer member;

a cleaning device disposed to be attachable to and detachable from the unit main body and including a cleaning member configured to clean the intermediate transfer member;

a storage section disposed in the cleaning device and configured to store first information regarding whether the cleaning device is new, and second information regarding whether the intermediate transfer member attached to the intermediate transfer unit is new, when the intermediate transfer unit to which the cleaning device that is new is attached, is attached to the image forming apparatus main body;

a first counting section configured to count an index value regarding a usage of the cleaning device from when the cleaning device is new;

a second counting section configured to count an index value regarding a usage of the intermediate transfer member from when the intermediate transfer member is new; and a control section configured to perform, in a case where the control section determines that the cleaning device is new based on the first information stored in the storage section, control so that the image forming section executes an operation for supplying toner to an abutment portion between the cleaning member and a surface of the intermediate transfer member, wherein, when the intermediate transfer unit is attached to the image forming apparatus main body, the control section performs control (a) to reset a counted value of the first counting section to an initial value and so as not to reset the counted value of the second counting section in a case where the first information indicates that the cleaning device is new and the second information indicates that the intermediate transfer member attached to the intermediate transfer unit is not new, and (b) to reset the counted value of the first counting section to the initial value and reset the counted value of the second counting section to an initial value in a case where the first information indicates that the cleaning device is new and the second information indicates that the intermediate transfer member attached to the intermediate transfer unit is new, and wherein the control section is configured to perform control so that supply control for supplying a predetermined toner image transferred onto the intermediate transfer member to the abutment portion between the cleaning member and the surface of the intermediate transfer member is executed during a non-image forming time, and performs, based on the counted value of the second counting section, control to change an amount of toner to be supplied to the abutment portion through the supply control per predetermined period correlated with the usage of the intermediate transfer member.

2. The image forming apparatus according to claim 1, further comprising an environment detection sensor configured to detect an environment, wherein, based on the counted value of the second counting section and a detection result of the environment detection sensor, the control section performs control to change the amount of toner to be supplied to the abutment portion through the supply control per predetermined period correlated with the usage of the intermediate transfer member.

* * * * *